US011058256B2

(12) United States Patent
He et al.

(10) Patent No.: US 11,058,256 B2
(45) Date of Patent: Jul. 13, 2021

(54) OUTDOOR AIR FRYER

(71) Applicant: Team International Group of America Inc., Miami Gardens, FL (US)

(72) Inventors: Arno He, Guangdong (CN); Uri Murad, Hollywood, FL (US)

(*) Notice: Subject to any disclaimer, the term of this patent is extended or adjusted under 35 U.S.C. 154(b) by 0 days.

(21) Appl. No.: 16/953,209

(22) Filed: Nov. 19, 2020

(65) Prior Publication Data
US 2021/0068588 A1 Mar. 11, 2021

Related U.S. Application Data

(63) Continuation-in-part of application No. 16/387,604, filed on Apr. 18, 2019, now Pat. No. 10,638,882.

(60) Provisional application No. 62/789,125, filed on Jan. 7, 2019.

(51) Int. Cl.
*A47J 37/07* (2006.01)
(52) U.S. Cl.
CPC ................. *A47J 37/0754* (2013.01)
(58) Field of Classification Search
CPC ............... A47J 37/0641; A47J 37/0754; A47J 37/0704; A47J 37/0786; A47J 37/07; A23L 5/17; A21B 1/10; F24C 15/322
See application file for complete search history.

(56) References Cited

U.S. PATENT DOCUMENTS

| 324,844 | A | 8/1885 | Huiskamp |
| 631,559 | A | 8/1899 | Clark |
| 5,121,737 | A | 6/1992 | Yencha |
| 5,676,870 | A | 10/1997 | Wassman |
| 5,994,672 | A | 11/1999 | Mestnik |
| 10,105,007 | B2 * | 10/2018 | Colston ............... A47J 37/0704 |
| 10,638,882 | B1 * | 5/2020 | He ...................... A47J 37/0754 |
| 10,881,246 | B2 * | 1/2021 | He ........................... A21B 1/26 |
| 2008/0098902 | A1 | 5/2008 | Mansfield |
| 2008/0206420 | A1 | 8/2008 | McFadden |
| 2011/0275023 | A1 | 11/2011 | Knight |
| 2017/0231430 | A1 * | 8/2017 | Moon ................. A47J 37/1266 99/331 |
| 2019/0387922 | A1 | 12/2019 | Jin |

FOREIGN PATENT DOCUMENTS

| EP | 3378363 A1 * | 9/2018 | ............. A47J 27/00 |
| GB | 2197458 | 5/1988 | |
| KR | 20050012379 | 2/2005 | |

* cited by examiner

*Primary Examiner* — Alfred Basichas
(74) *Attorney, Agent, or Firm* — Frank Marino

(57) ABSTRACT

An outdoor cooker includes an air frying apparatus with a blower, a heater, and a cooking chamber. The cooking chamber has a perforated basket for receiving foodstuff. The blower is adapted to force air through the heater to become heated, into the cooking chamber to air fry the foodstuff, and then back through the heating element in a continuous cycle.

18 Claims, 27 Drawing Sheets

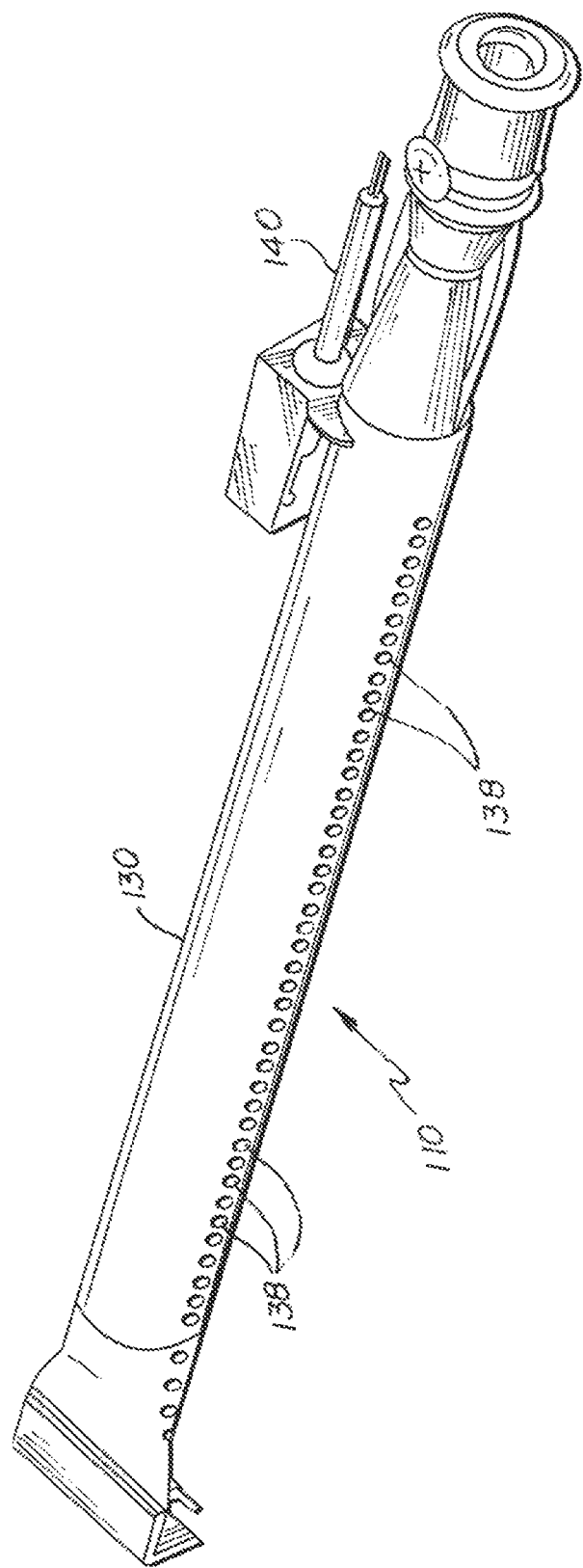

OUTDOOR AIR FRYER

FIELD OF THE INVENTION

The invention relates to apparatuses for frying foodstuffs in hot air and without submersion in cooking oil.

BACKGROUND

Common electrical air frying appliances include an electric heating element for heating air within the appliance and a blower for forcing the air over and around the foodstuffs to be air-fried. Such appliances function adequately but are made only for indoor use and may cause smoke and undesired cooking fumes. Summertime is a very popular time for outdoor cooking. Many fried foods, such as fried chicken, onion rings, and fried claims are popular summertime food, but have so far required indoor cooking. Few food items are as historically paired as hamburgers and French fries, yet summertime burgers are typically cooked outdoors while French fries have so far required indoor cooking.

In order to simulate the qualities of properly deep-fried foods, air fried foods must be exposed to turbulent air having a temperature of approximately 220 degrees C. This ensures the even browning and crispiness like that which is obtained when cooking in hot oil. But such is difficult to obtain from a propane flame. While propane burns at a very high temperature, transferring that heat from the flame in a highly turbulent environment to obtain the needed air-frying temperature and turbulence at the food is difficult due to the requirement to intake ambient (cool) air to provide oxygen for the combustion.

There exists the need for an apparatus which allows for the outdoor cooking of fried foods, and such may be an object of the invention. There exists the need for an apparatus which allows for such outdoor cooking of fried foods in combination with outdoor cooking, and such may be an object of the invention. There exists the need for the ability to share cooking utensils, clean-up, and other things between traditional outdoor cooking and outdoor air frying, and such may be an object of the invention. There exists the need for a system which causes a high enough temperature at its heat source to result in adequate air-frying conditions at the food, and such may be an object of the invention. There exists the need for a system using a blower that causes the needed turbulence for those adequate air-frying conditions at the food, and such may be an object of the invention. Further needs and objects of the invention will become apparent upon a review of the following disclosure of an exemplary embodiment.

SUMMARY OF THE INVENTION

The invention may be embodied in or practiced using an air-frying appliance as an accessory to a traditional outdoor cooker.

The invention may be embodied in or practiced using an air frying apparatus with a blower-heater portion and a chamber portion. The blower-heater portion may have an intake for receiving ambient air, a heater for heating the received air, a window in communication with the chamber portion, and a blower for dispersing the heated air into the chamber portion. The chamber portion may include a perforated basket for receiving foodstuff and may be adapted to allow access to the foodstuff by the dispersed heated air. The air heated by the heater may be dispersed through the window to the chamber portion by the blower where it air-fries the foodstuff in the basket. The blower-heater portion and the chamber portion may be within a housing and the chamber portion may have a drawer adapted to be pulled from the housing to access the basket. The drawer may be covered by the housing during the air-frying and may be uncovered when pulled from the housing to allow the access to the basket. The chamber portion may have an outlet for exhausting the heated air from the chamber portion. The drawer may have a handle disposed in a front thereof, and the outlet may be directed rearwardly and away from the handle. The heater may be a gas burner. The blower may be an electric blower. The blower may cause the received air to feed a flame of the gas heater and thereby increase its temperature to increase the heated air's temperature. The heated air's increased temperature may be approximately 220 degrees C. when reaching the chamber portion.

The invention may also be embodied in or practiced using, in combination, a gas barbeque grill and the above air frying apparatus. The gas barbeque grill may provide the above housing. The drawer may be covered by the gas barbeque grill during the air-frying and may be uncovered when pulled from the gas barbeque grill to allow the access to the basket.

The invention may also be embodied in or practiced using an outdoor cooker with an air frying apparatus having a blower-heater portion and a chamber portion wherein the blower-heater portion includes a heating element for heating air and a blower for forcing the air to be heated through the heating element and into the chamber portion. The chamber portion may include a perforated basket for receiving foodstuff and may be adapted to allow access to the foodstuff by the dispersed heated air. When the heater and blower are energized, the air heated by the heater may be dispersed to the chamber portion by the blower where it air-fries the foodstuff in the basket and may then be forced by the blower back through the heating element in a continuous cycle. The blower-heater portion and the chamber portion may be within the outdoor cooker and the chamber portion may include a drawer adapted to be pulled from the outdoor cooker to access the basket. The drawer may be covered by the outdoor cooker during the air-frying and uncovered when pulled from the outdoor cooker to allow the access to the basket. The drawer may have a handle disposed on a front of the outdoor cooker. When the heater and blower are energized, the air may be forced after air frying the foodstuff by the energized blower back through the energized heating element in a continuous cycle until the air's temperature is approximately 220 C, and then the heating element may be de-energized while the blower remains energized until the air's temperature drops to approximately 200 C. The heating element may be an electric heating element. The electric heating element may be a serpentine tubular element. The blower may be an electric blower. The electric blower may be an electric centrifugal blower.

The invention may also be embodied in or practiced using an outdoor cooker with an air frying apparatus having a blower portion, a heater portion and a chamber portion wherein the heater portion may include a heating element for heating air and the blower portion may include a blower for forcing the air to be heated through the heating element and into the chamber portion. The chamber portion may include a perforated basket for receiving foodstuff and may be adapted to allow access to the foodstuff by the dispersed heated air. When the heater and blower are energized, the air heated by the heater may be dispersed to the chamber portion by the blower where it air-fries the foodstuff in the basket and may then be forced by the blower back through the heating element in a continuous cycle. The blower portion, heater portion, and chamber portion may be within the outdoor cooker and the chamber portion may have a drawer adapted to be pulled from the outdoor cooker to access the basket. The drawer may be covered by the outdoor cooker during the air-frying and uncovered when pulled from the outdoor cooker to allow the access to the basket. The drawer may have a handle disposed on a front of the outdoor cooker. When the heater and blower are energized, the air may be forced after air frying the foodstuff by the energized blower back through the energized heating element in a continuous cycle until the air's temperature is approximately 220 C, and then the heating element may be de-energized while the blower remains energized until the air's temperature drops to approximately 200 C. The heating element may be an electric heating element. The electric heating element may be a serpentine tubular element. The blower may be an electric blower. The electric blower may be an electric centrifugal blower.

Further features and aspects of the invention are disclosed with more specificity in the Detailed Description and Drawings provided herein and showing exemplary embodiments of the invention.

BRIEF DESCRIPTION OF THE DRAWINGS

Exemplary embodiments of air frying accessories for outdoor cookers in accordance with or useful in practicing the invention is shown in the accompanying Drawings, of which;

FIG. 10 is a view of the heater of the accessory of FIG. 1;

DESCRIPTION OF AN EXEMPLARY EMBODIMENT

Figure 1:
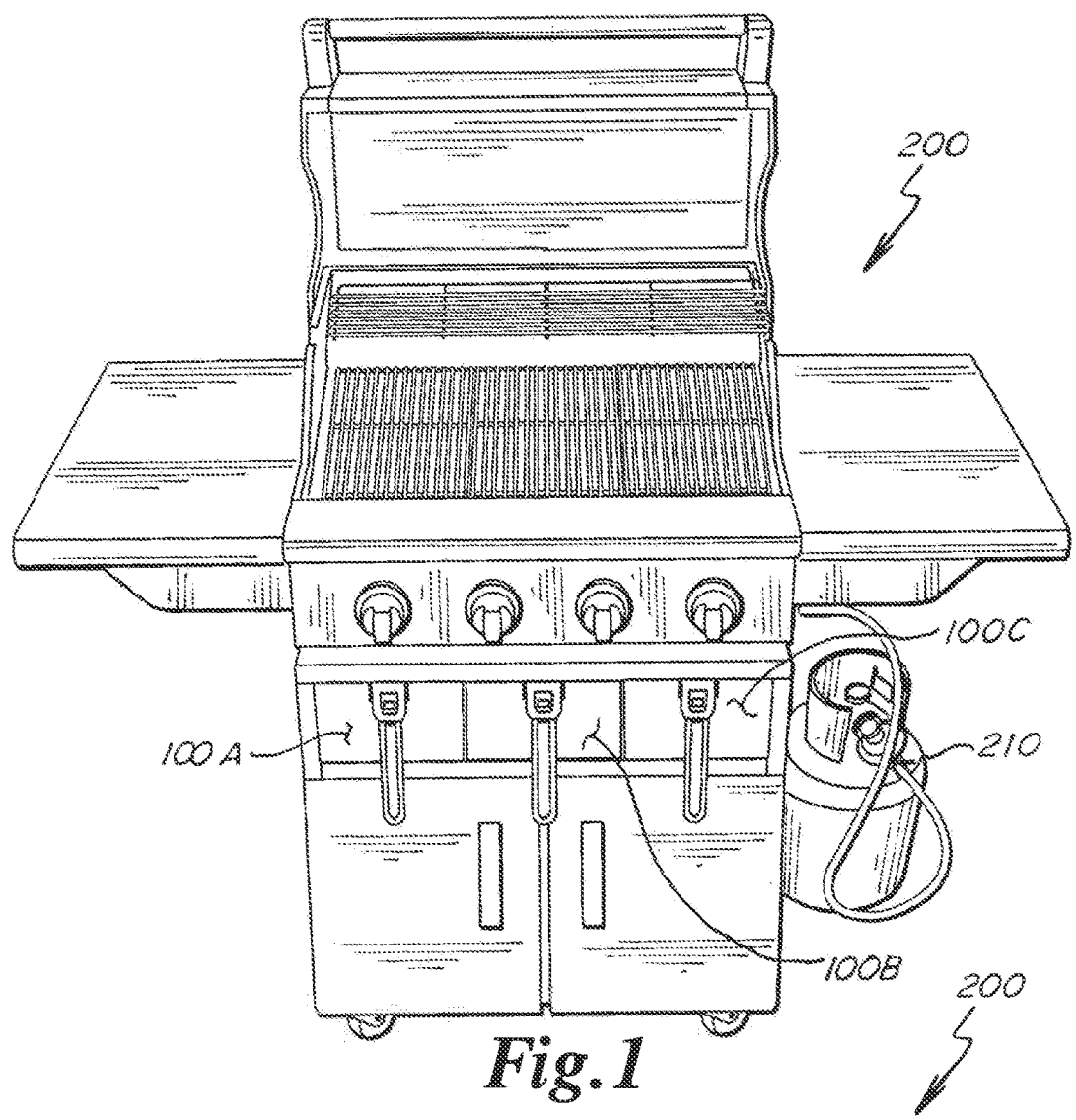
FIG. 1 is a front view of a gas barbeque grill employing a first exemplary air frying accessory.
Figure 2:
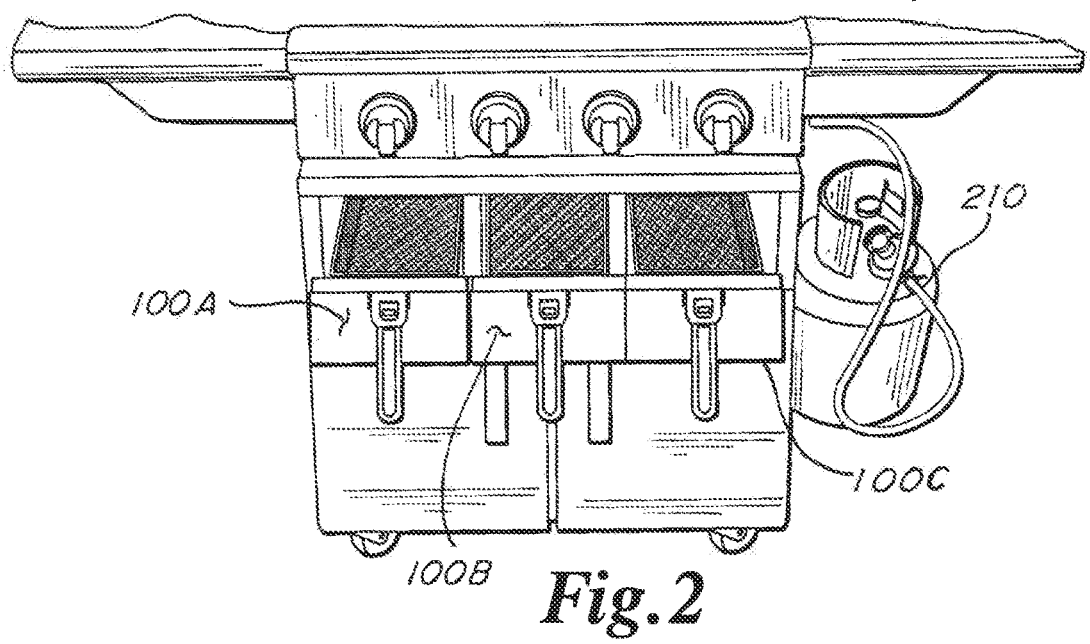
FIG. 2 is a partial front view of the barbeque grill of FIG. 1 with the drawers of the accessory opened.
Figure 3:
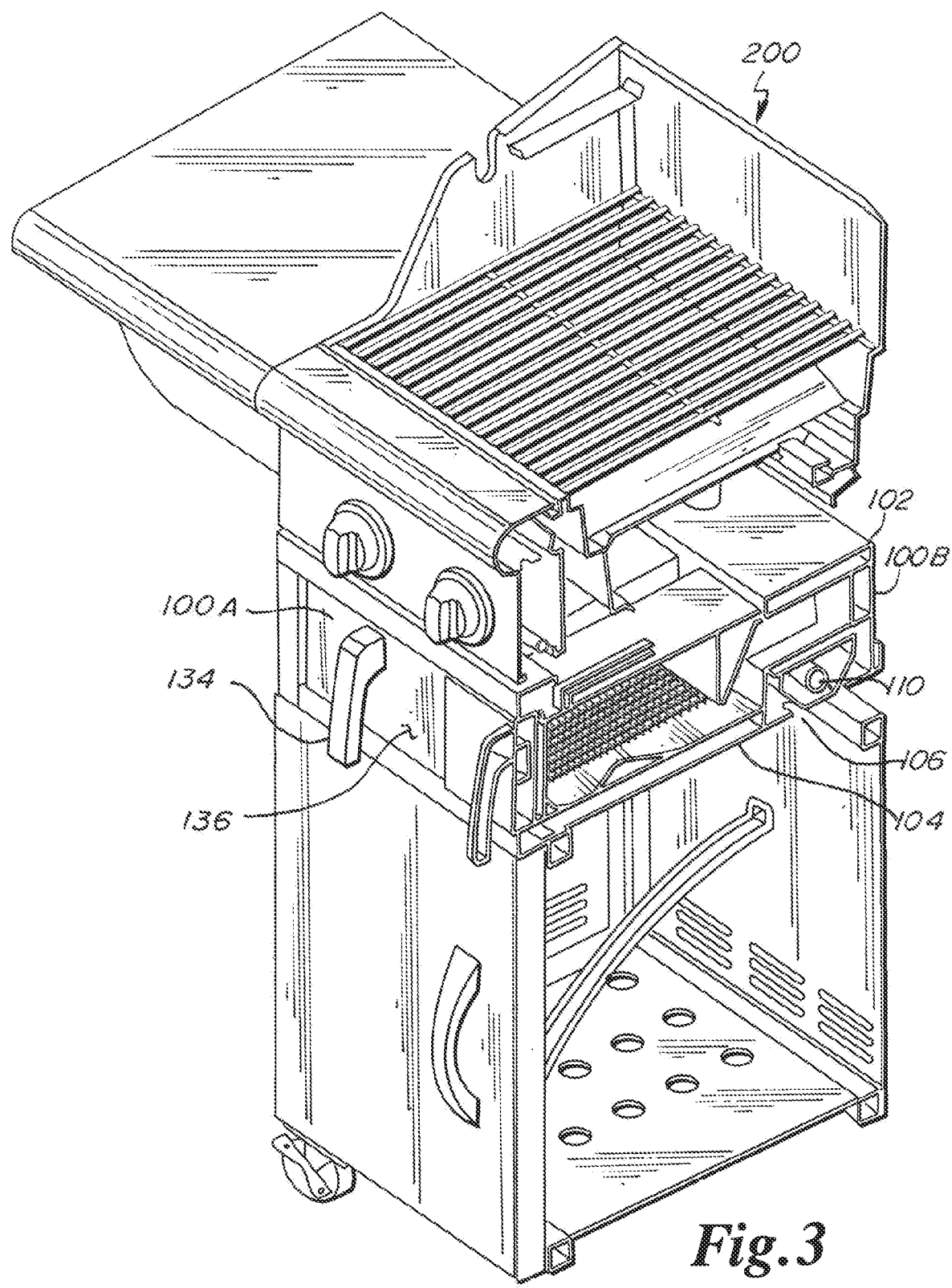
FIG. 3 is a partial cut-away front perspective view of the barbeque grill and accessory of FIG. 1.
Figure 4:
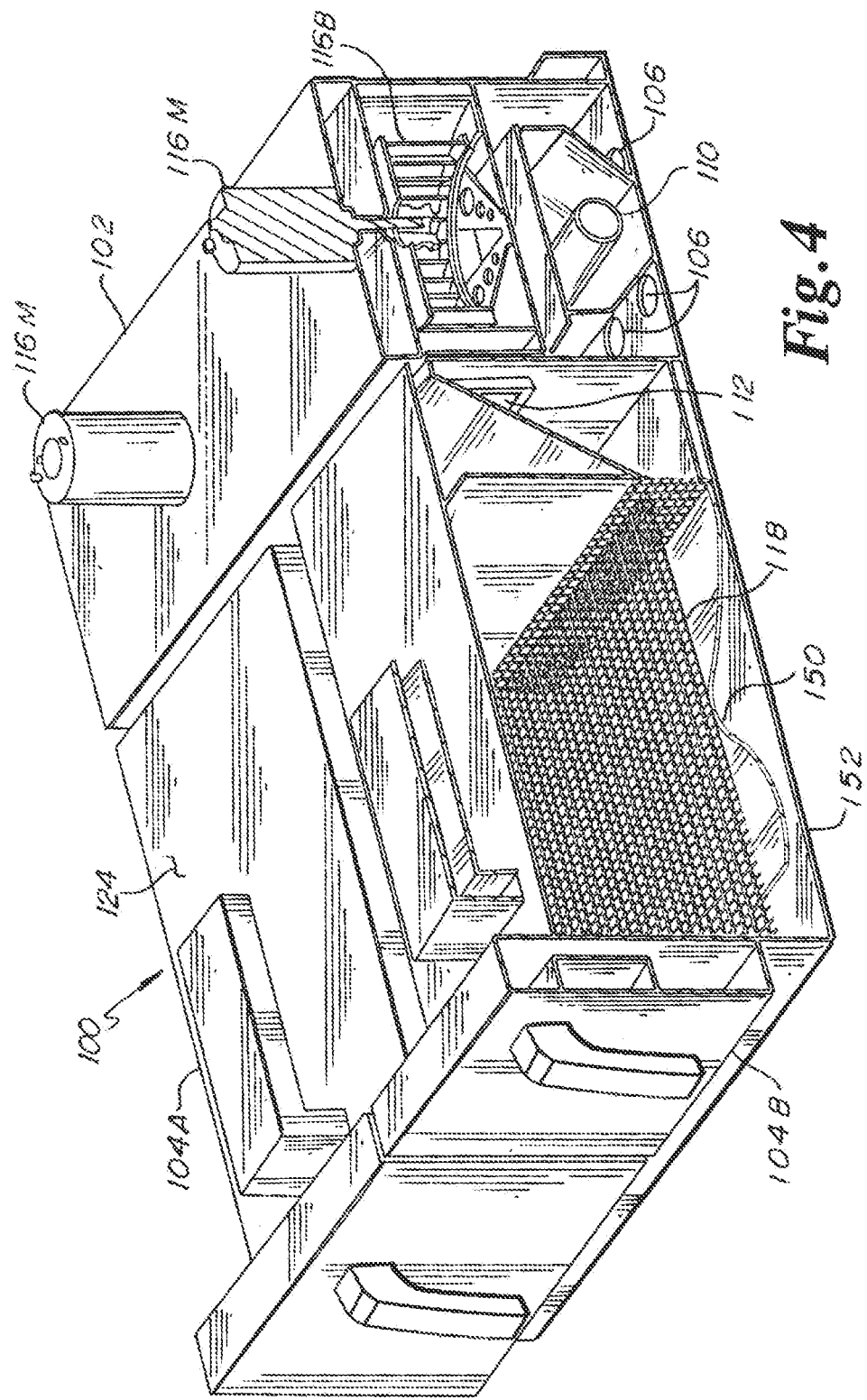
FIG. 4 is a partial cut-away perspective view of the accessory of FIG. 1.
Figure 5:
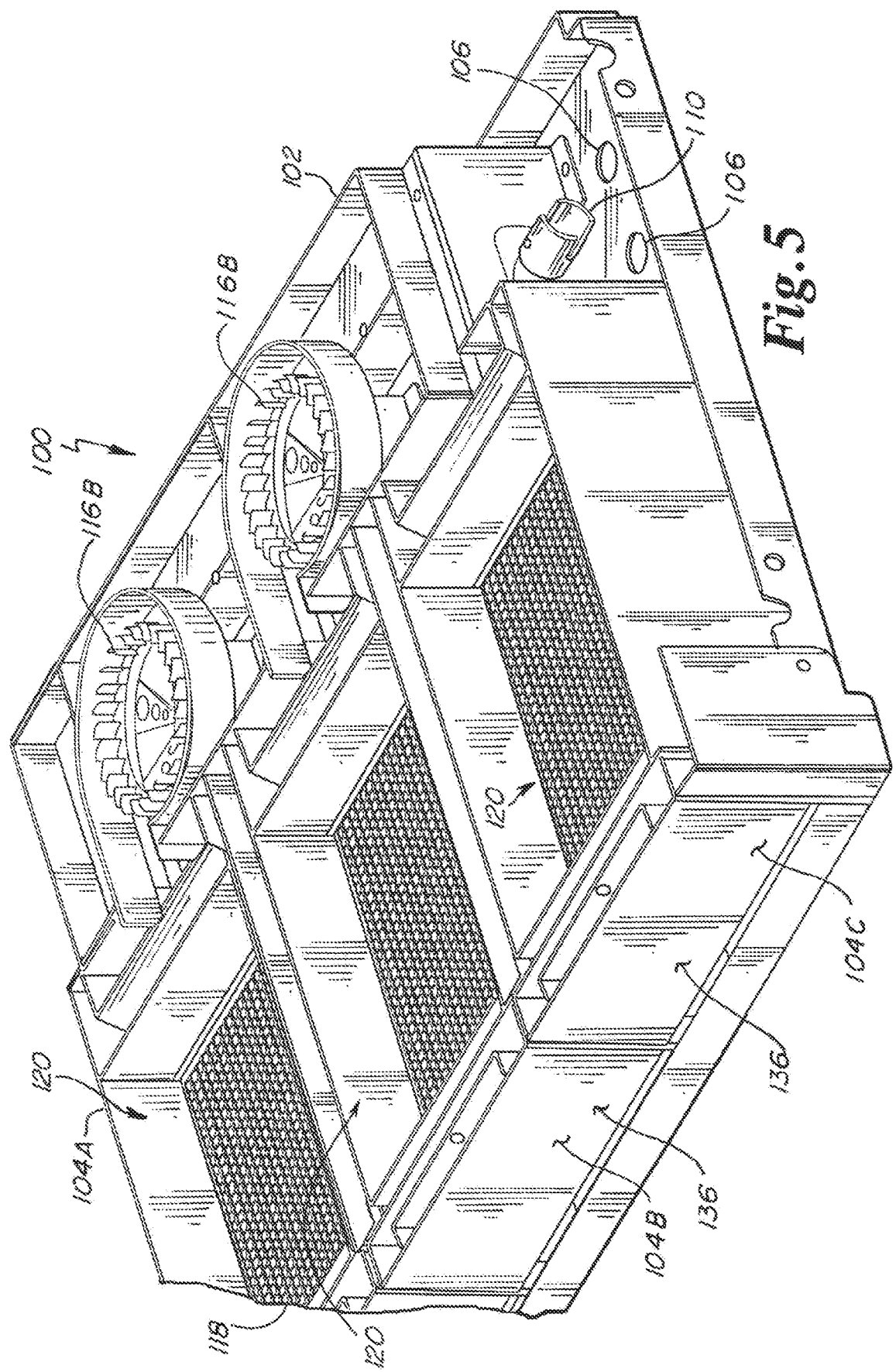
FIG. 5 is a partial perspective view of the accessory of FIG. 1.
Figure 6:
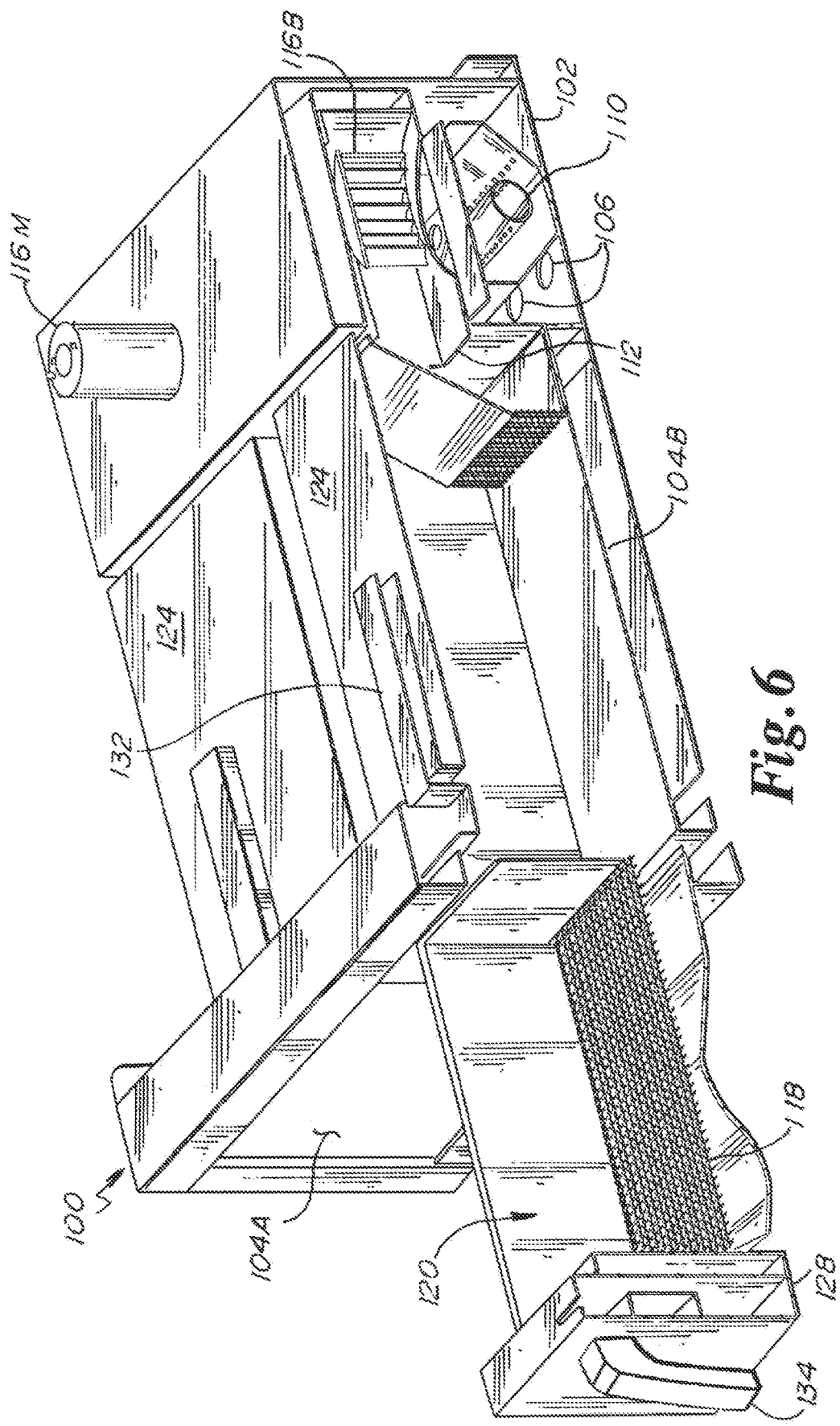
FIG. 6 is a partial cut-away perspective view of the accessory of FIG. 1 with one of its drawers opened.
Figure 7:
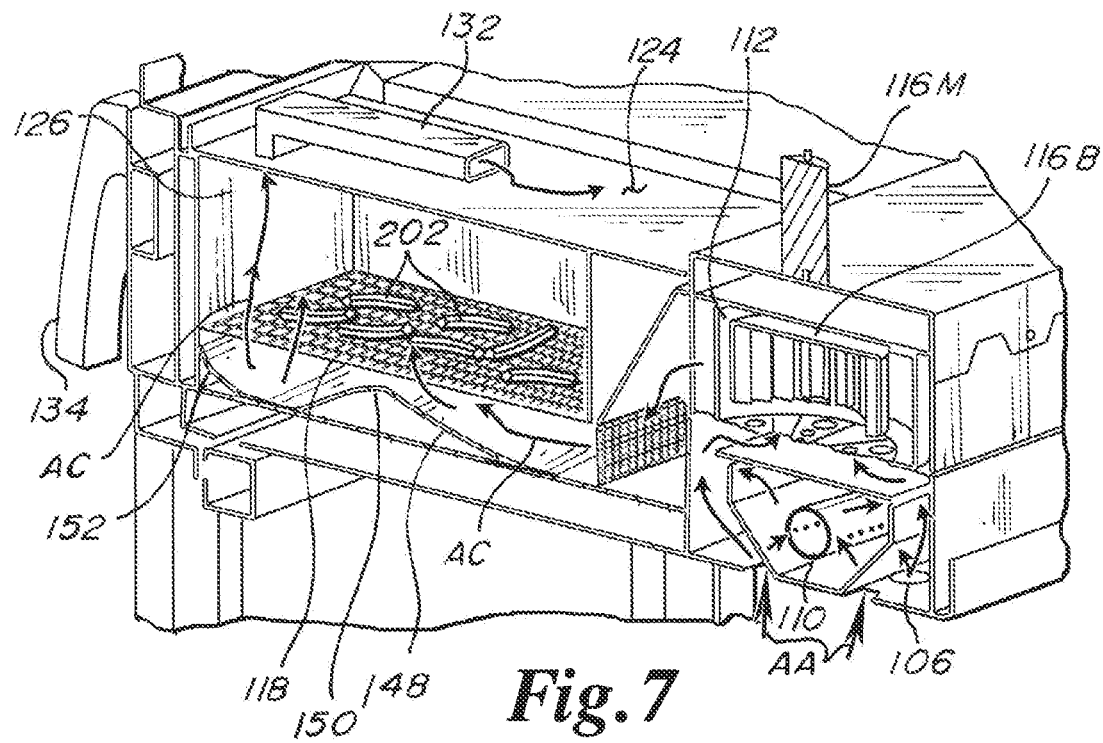
FIGS. 7 and 8 are cut-away views showing the airflow through the accessory of FIG. 1.
Figure 8:
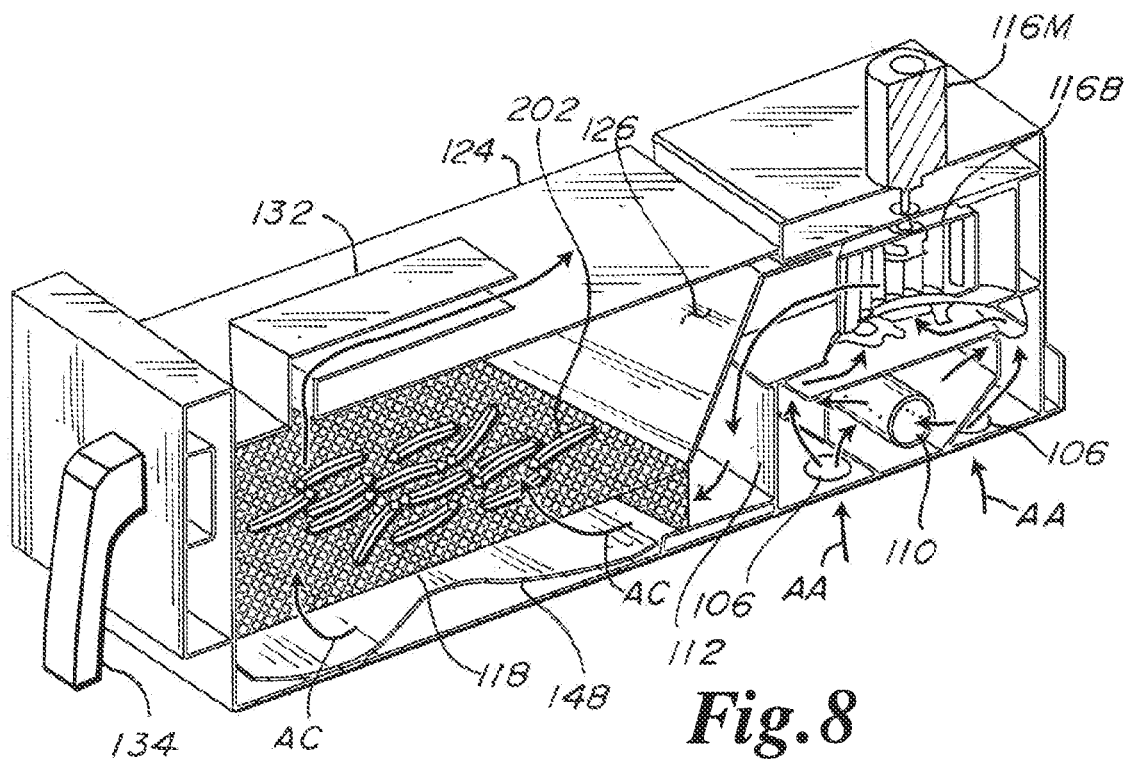
Figure 9:
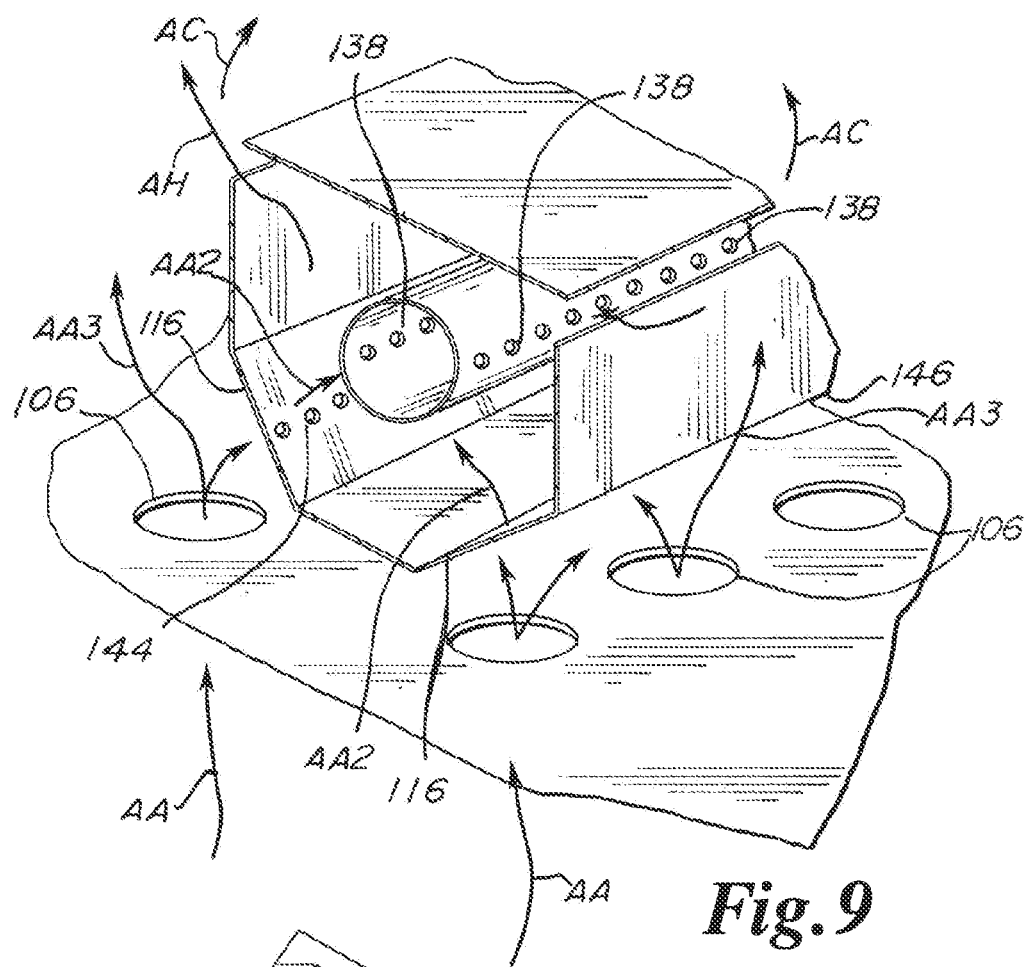
FIG. 9 is a partial perspective view of the combustion enclosure of the accessory of FIG. 1.

Referring to FIGS. 1 through 10, there is shown an exemplary air frying accessory 100 having plurality of modules 100A, 100B, and 100C, and a gas barbeque grill 200 within which it is used. The air frying accessory and the barbeque grill both receive propane gas for burning from the same tank 210. But of course, the type of gas used for fuel could alternatively be any other available flammable gas, including such gases as natural gas, methane, butane, and mixed gases. The air frying modules are all the same, and by having a plurality it enables the user to air-fry different foods at the same time or to stagger the timing of air-fried servings.

The air frying accessory has a blower-burner portion 102 and each module has a chamber portion 104A, 104B, and 104A (individually as 104). The blower-burner portion has intakes 106 for receiving ambient air AA, a heater 110 for heating the received air, a window 112 in communication with the chamber portion, and a blower 116 for each module for dispersing the heated air into the associated module's chamber portion. The blowers each include an electric motor 116M and a cylindrical blower wheel 116B. The chamber portion includes a perforated bottom panel 118 to thereby function as a perforated basket 120 for receiving foodstuff 202 and to allow access to the foodstuff by the dispersed heated air AC. The chamber portion is covered by chamber cover 124 so that the basket is enclosed within cooking chamber 126 during frying. The heated air is dispersed through the window to the chamber portion and into and around the foodstuff in the cooking chamber by the blower where it air-fries the foodstuff.

The blower-burner portion and the chamber portion are housed by the gas barbeque grill 200. The bottom of the chamber portion is a drawer 128 adapted to be pulled from the gas barbeque grill to access the basket. When the drawers are so pulled from the barbeque, covers 124 remain stationary within the barbeque. The open top of the drawer is thereby covered by the gas barbeque grill 200 during the air-frying and is uncovered when pulled from the gas barbeque grill to allow the access to the basket.

Each chamber portion includes an outlet 132 for exhausting the heated air from the chamber during cooking, so that freshly heated air may enter through the perforated bottom panel to maintain the desired temperature within the chamber.

Each drawer has a handle 134 disposed on its front face 136, and the outlet is directed rearwardly within the barbeque and away from the handle. In this way, the front of the barbeque, accessory, and handle do not become too hot to touch, and the exhausted hot air can be repurposed to add heat for the barbequing above.

The heater 110 is shown independently in FIG. 10 and is a typical tubular gas heater similar to those commonly used in gas barbeques, having an elongated stainless steel tube 130 with a line of orifices 138 along each side. Gas flows from the orifices and is ignited by ignitor 140, which is a typical magneto spark-producing device common built into gas barbeques and actuated by a trigger button (not shown). The gas burns during frying to provide heat for frying.

Figure 11:
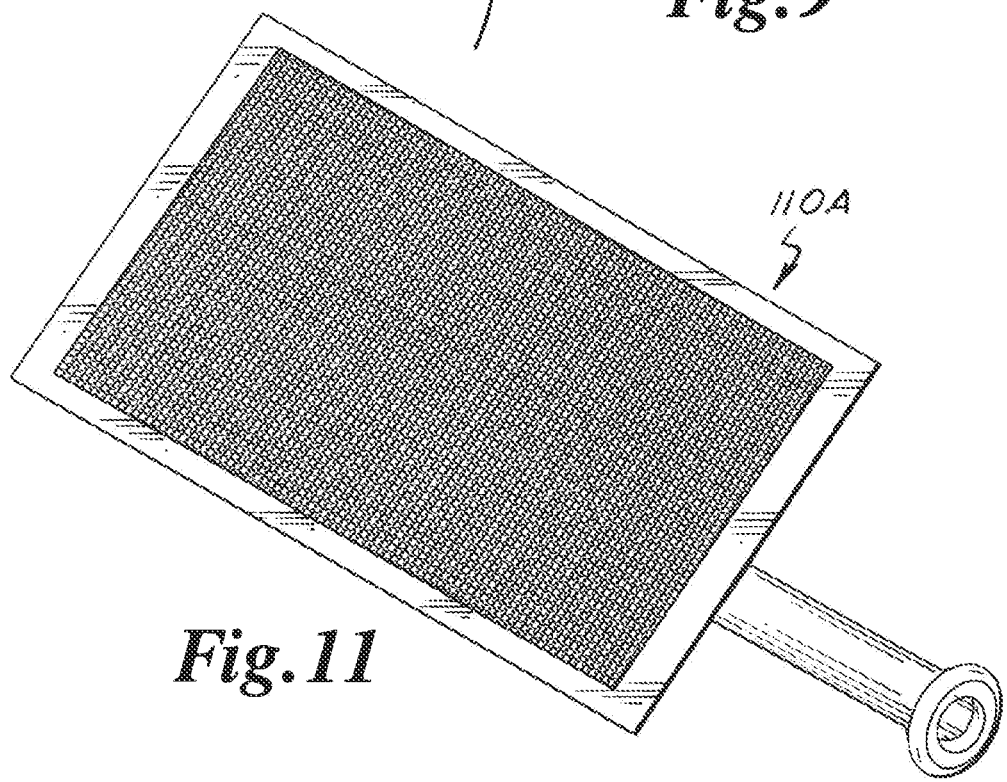
FIG. 11 is a view of an alternate gas infrared heater for the accessory of FIG. 1.
Figure 12:
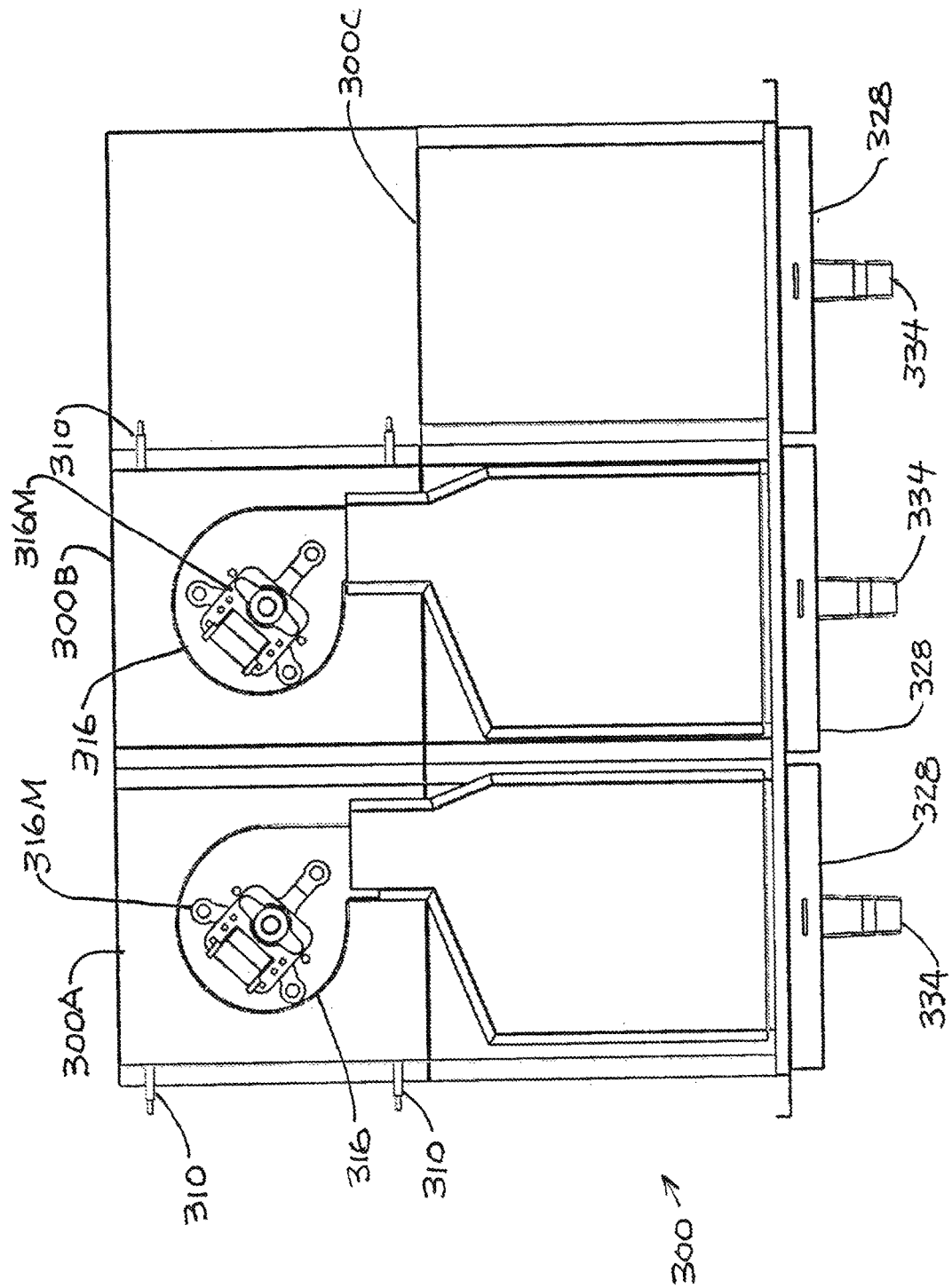
FIG. 12 is a top view of a second exemplary air frying accessory.
Figure 13:
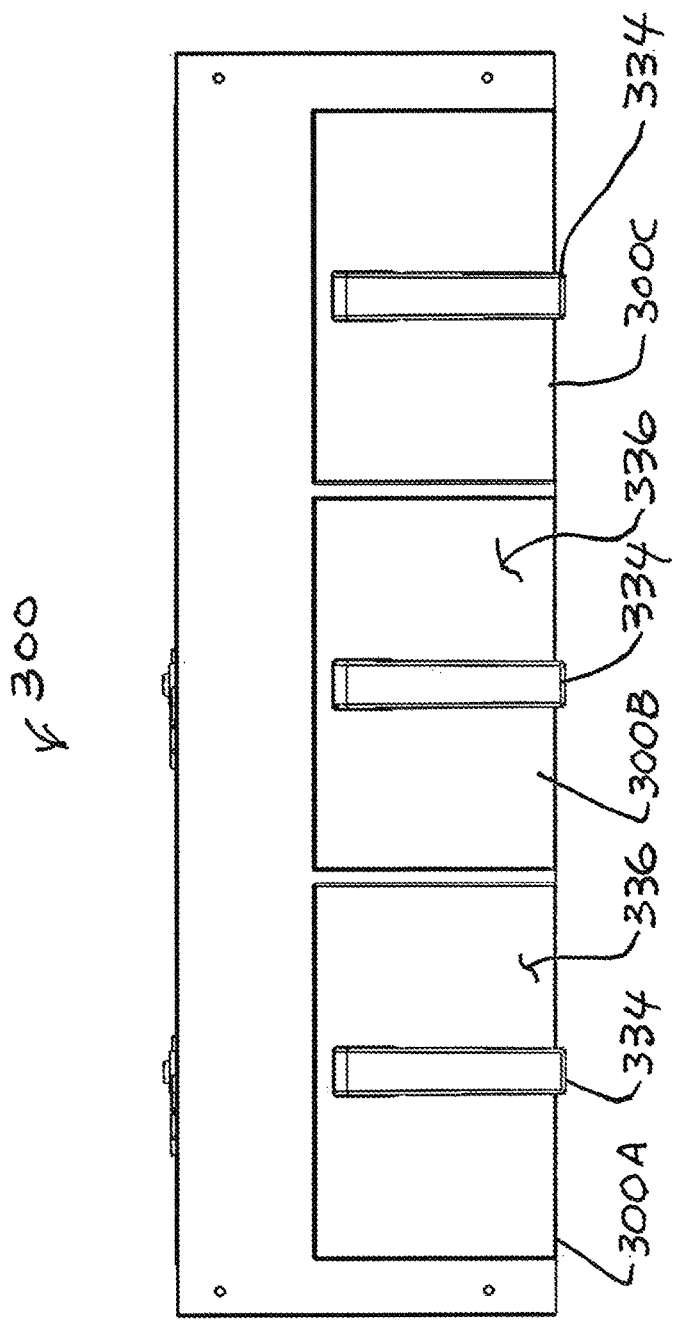
FIG. 13 is a front view of the accessory of FIG. 12.
Figure 14:
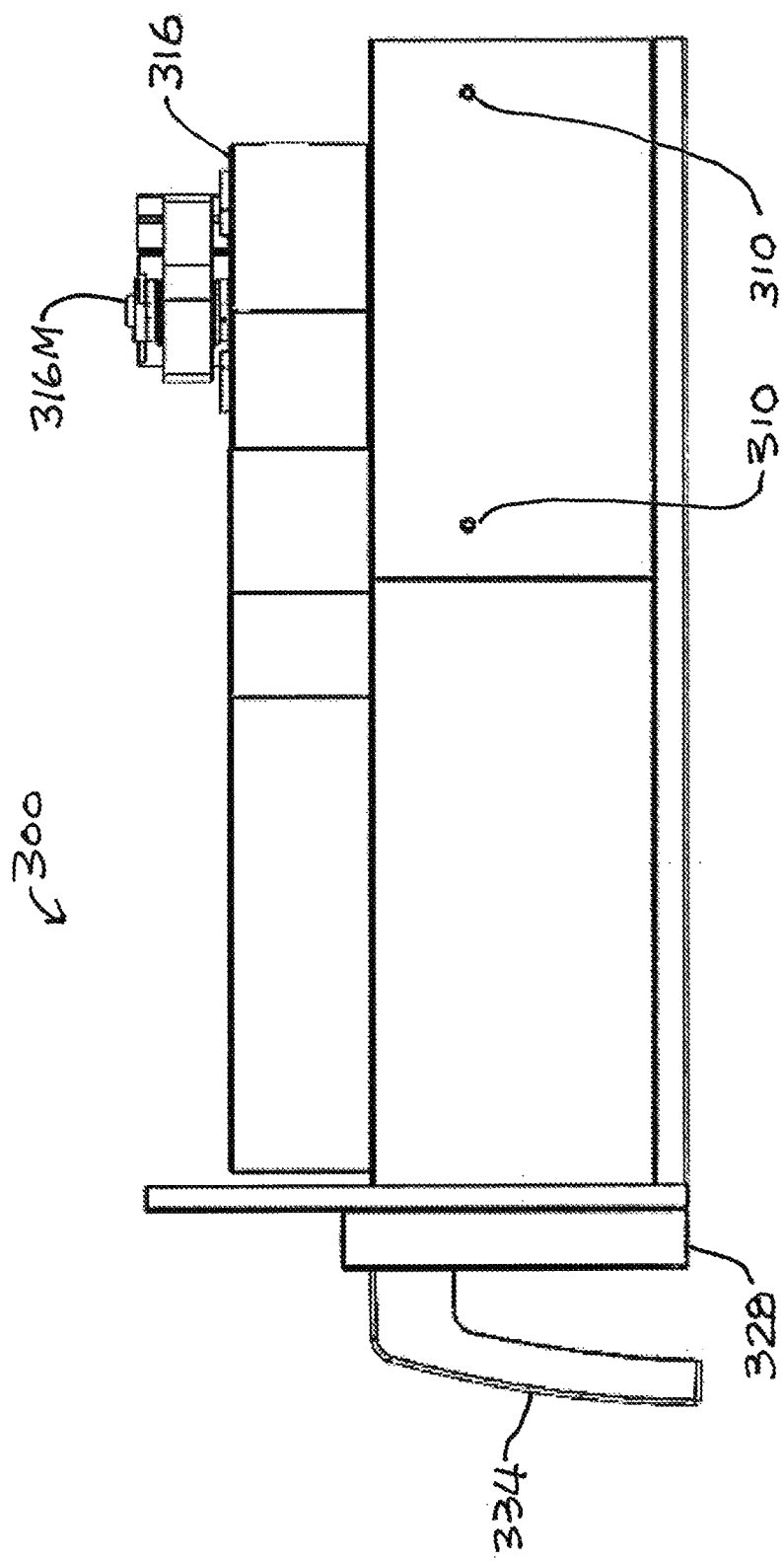
FIG. 14 is a right side view of the accessory of FIG. 12.
Figure 15:
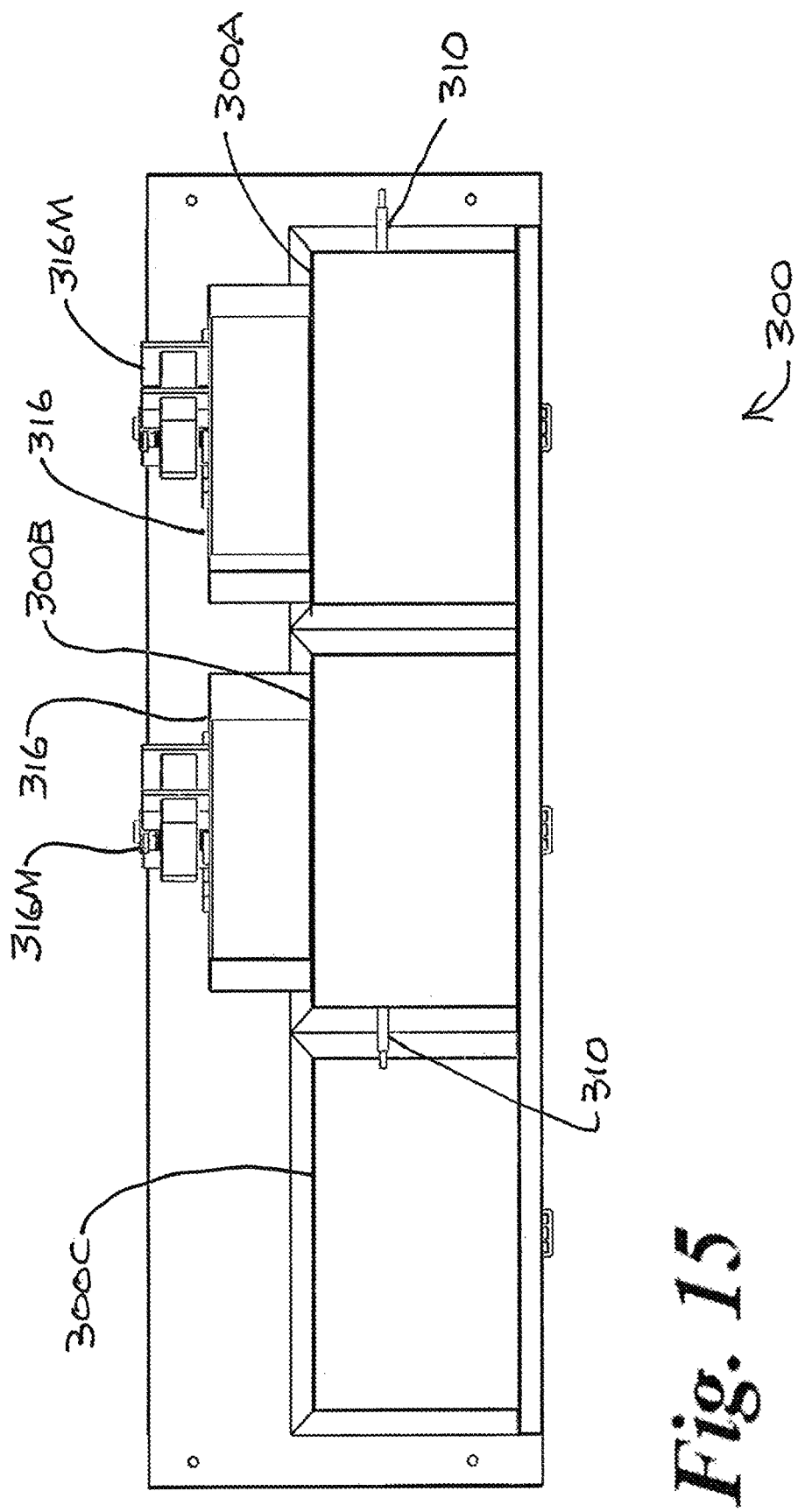
FIG. 15 is a rear view of the accessory of FIG. 12.
Figure 16:
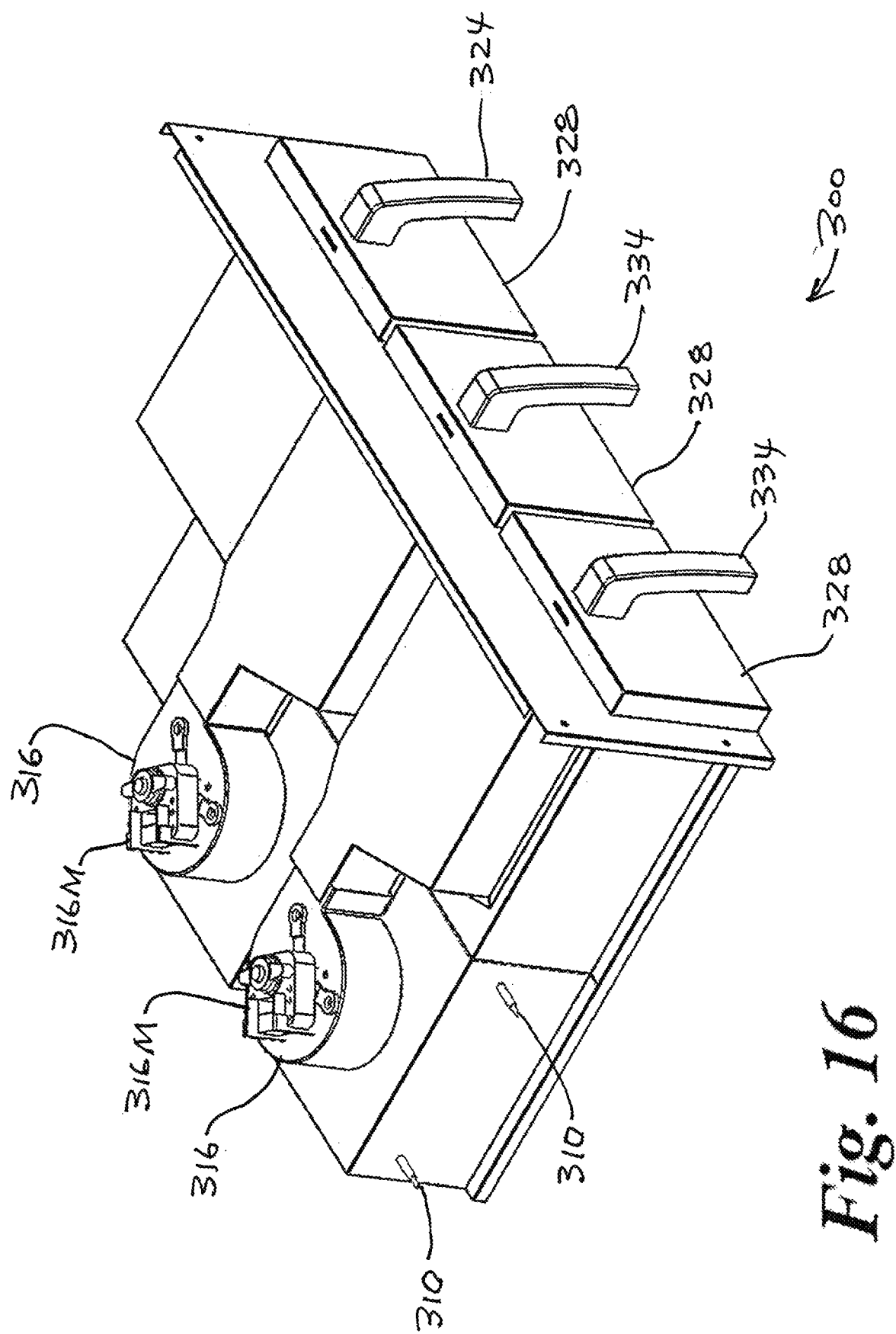
FIG. 16 is a left perspective view of the accessory of FIG. 12.
Figure 17:
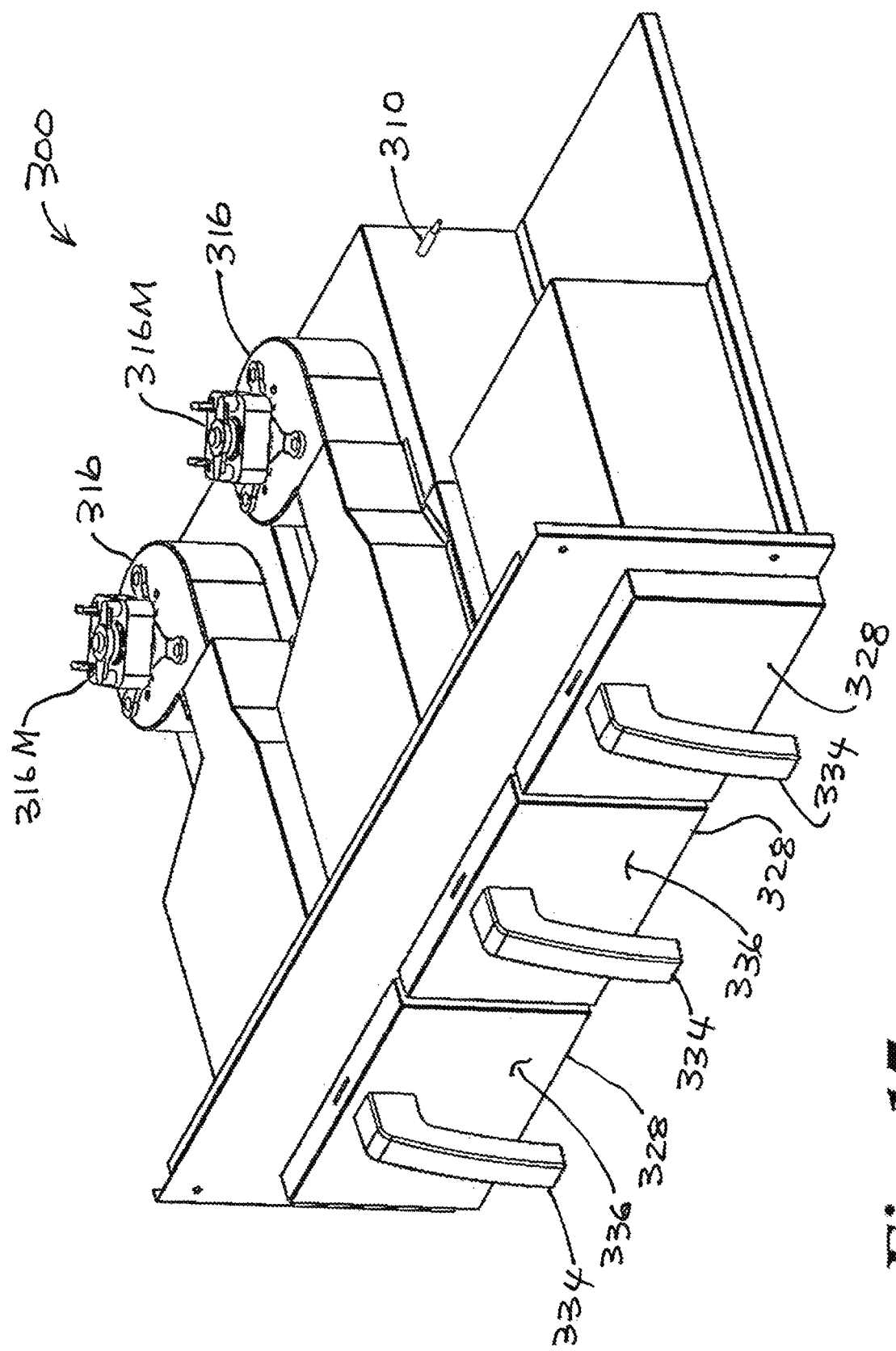
FIG. 17 is a right perspective view of the accessory of FIG. 12.
Figure 18:
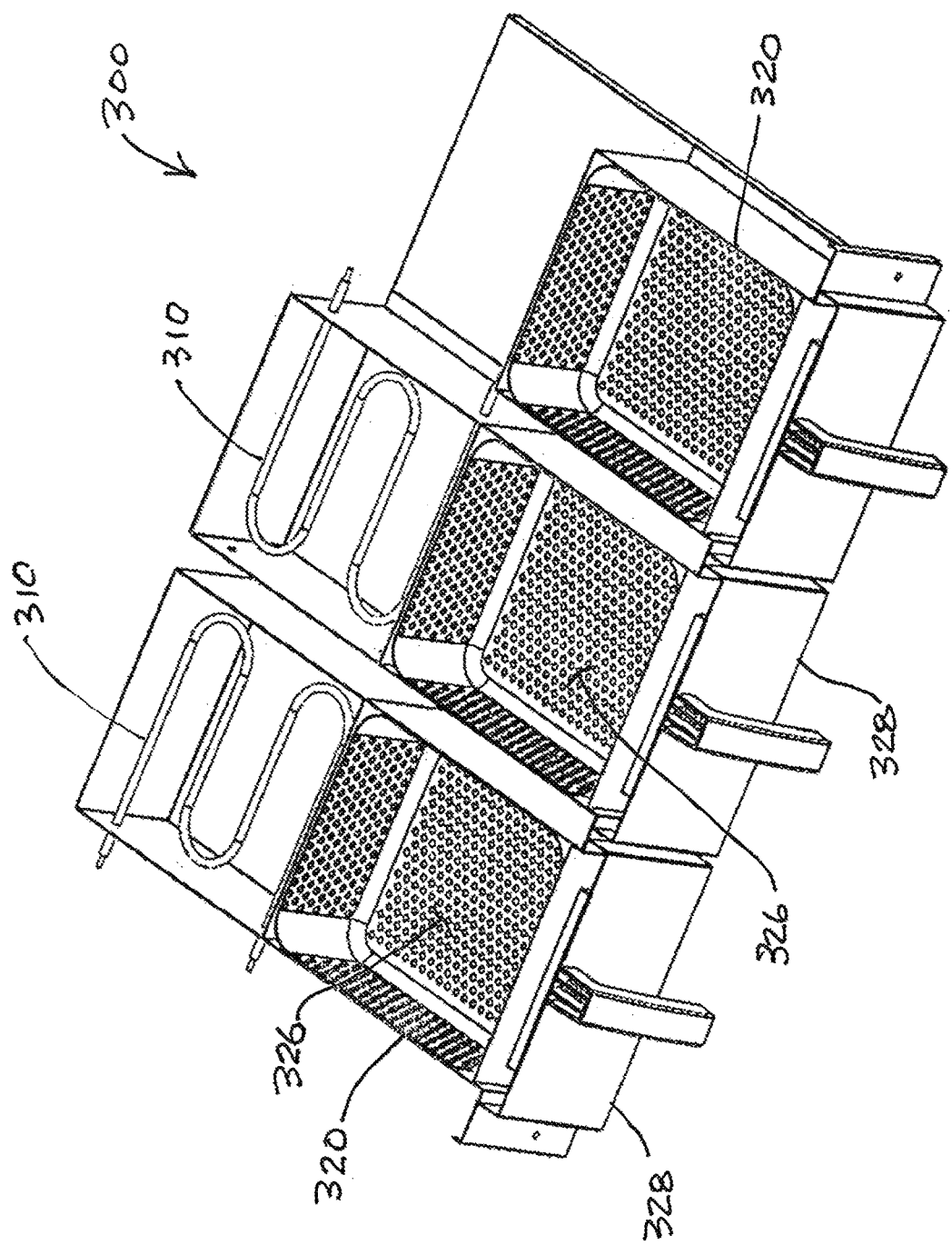
FIG. 18 is a partial top perspective view of the accessory of FIG. 12.

An alternative infrared gas heater 110A is shown in FIG. 11, which is similar to those commonly used in searing barbeques.

It is a unique feature of the heater and blower portion that the temperature of the flame is increased by the blower, by pulling ambient air AA in through ambient air intakes 106 at the bottom of the heater and blower portion and drawing some AA2 of that air through a line of ports 144 along the diagonal walls 116 along the bottom of the burner's stainless steel combustion enclosure 146. This is all best seen in FIGS. 7 through 9.

The ports are arranged parallel to and are directed at the line of orifices 138 of the heater and sized to force the incoming air into a series of linear air jets which impinge as upon the base of the flames exiting the orifices. This injects oxygen directly into the base of each flame and increases its temperature to over 1000 C and increases the flame's intensity significantly. The air directed at the flame is strong enough to increase gas combustion but not strong enough to blow out the flame. The "super-heated" air AH that is thereby created is mixed with that portion AA3 of the ambient air that bypassed the combustion enclosure 146 to create cooking air AC of approximately 230 C, which is then pulled by the blower and forced through window 112, through the perforated bottom panel 118 and into the basket, by which time the long and serpentine air path has cooled it to approximately 200 C to 223 C which is prefect for cooking the food therein.

The injection of ambient air into the flame also causes the propane to burn more evenly and efficiently, and reduces the production of undesirable CO and NOx gases.

Stainless steel wave panel 148 of the drawer serves the purpose of turbulizing and directing the cooking air as it enters the basket, which is important for evenly cooking and browning the food. The wave panel has two ramps 150 and 152 which are perpendicular to the airflow. Ramp 150 is impacted first by the heated air and causes some of the heated air to pass immediately through the perforated bottom panel and into the basket while allowing the remainder of the heated air to pass there-over and under the perforated bottom panel towards ramp 152, which then deflects that remaining air towards and through the perforated bottom panel. This results in a very even distribution of the heated air through the perforated bottom panel while allowing it to remain in a very turbulent state, so that the food is exposed to the cooking air evenly on all sides and from all directions.

The cooking air is then exhausted through outlet 132, which directs it back away from the user-accessible front 154 of the accessory and into the interior of the barbeque grill . . . where it may be used to compliment the barbequing heat.

Referring now to FIGS. 12 through 19, there is shown a second exemplary air frying accessory 300 having plurality of modules 300A, 100B, and 100C, for use within an outdoor cooker such as, but not limited to, barbeque grills like gas barbeque grill 200 of the first embodiment. Module 300A and 300B are identical air frying modules and module 300C is a warming module, but any reasonable combination and number of modules is anticipated.

The air frying modules each have a blower-heater portion 302 and all modules have a chamber portion 304A, 304B, and 304C. Each blower-heater portion has a heating element 310 for heating the air and a blower 316 for dispersing the heated air into the associated module's chamber portion.

The blowers are electrical centrifugal blowers, each including an electric motor 316M and a cylindrical blower wheel 316B. The chamber portion includes a perforated basket 320 for receiving foodstuff and to allow access to the foodstuff by the dispersed heated air. The chamber portion is covered by chamber cover 324 so that the basket is enclosed within cooking chamber 326 during frying. The heated air is dispersed to the chamber portion and into and around the foodstuff in the cooking chamber by the blower where it air-fries the foodstuff.

The blower-heater portion and the chamber portion are housed by an outdoor cooker in the same way as in the first embodiment. The bottom of the chamber portion is a drawer 328 adapted to be pulled from the cooker to access the basket. When the drawers are so pulled from the cooker, covers 324 remain stationary within the cooker. The open top of the drawer is thereby covered by the cooker during the air-frying and is uncovered when pulled from the cooker as described in the first embodiment, to allow the access to the basket. Each drawer has a handle 334 disposed on its front face 336.

The heater 310 is a typical serpentine tubular resistance heater, but any other acceptable form of air heating element is anticipated, such as a radiant heating element, an infrared heating element, a PTC heating element, etc.

Figure 19:
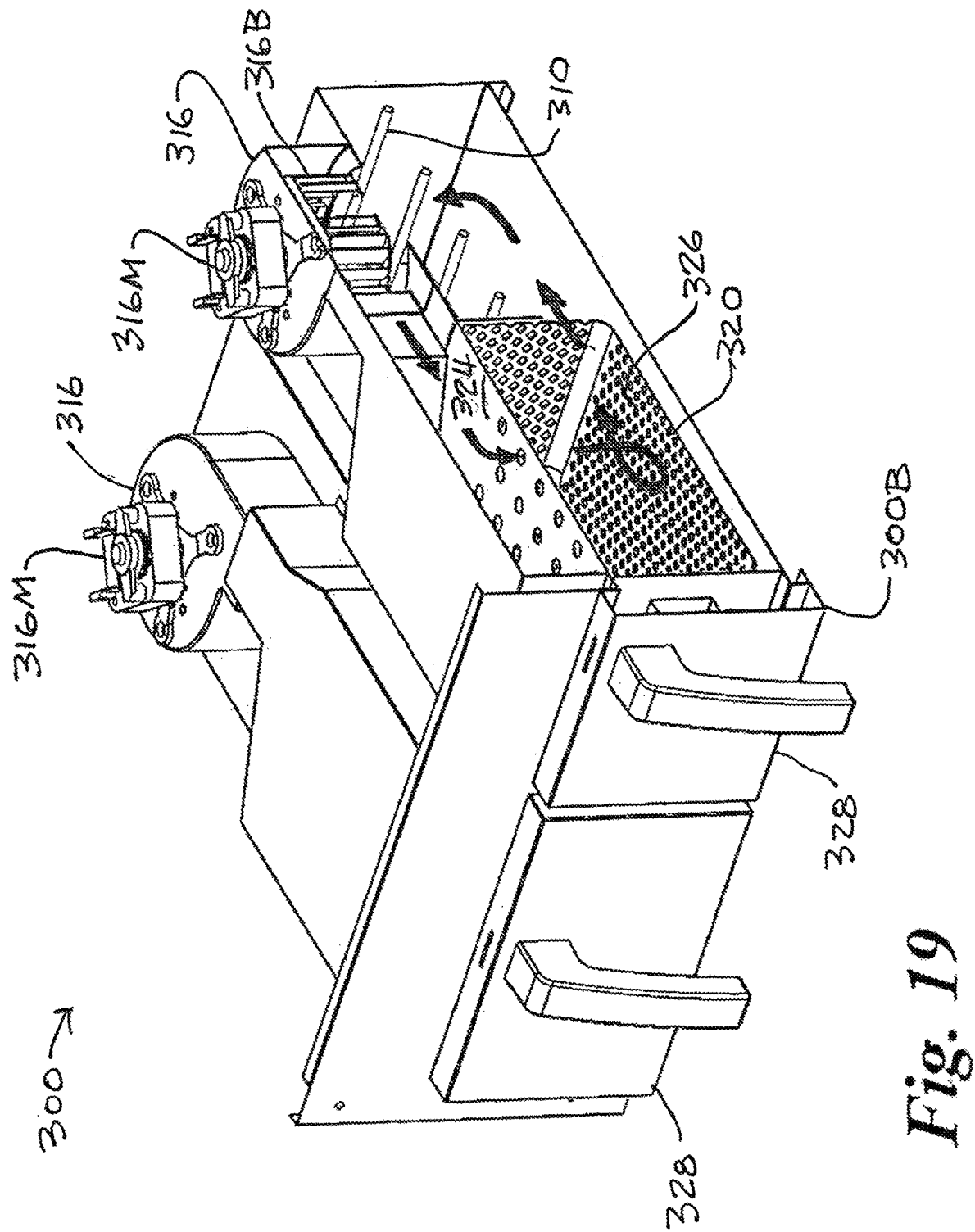
FIG. 19 is a cut-away right perspective view of the accessory of FIG. 12.
Figure 20:
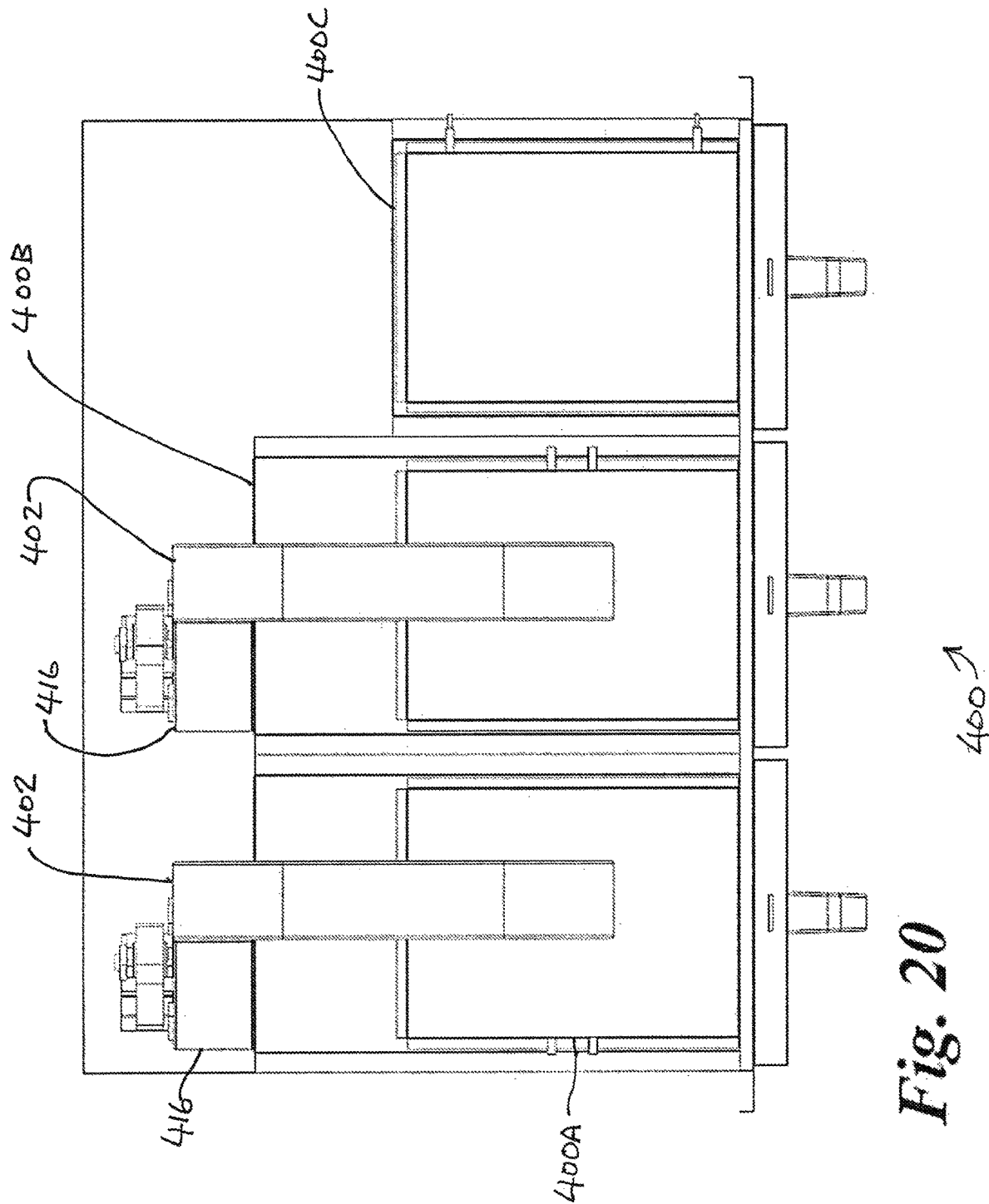
FIG. 20 is a top view of a third exemplary air frying accessory.
Figure 21:
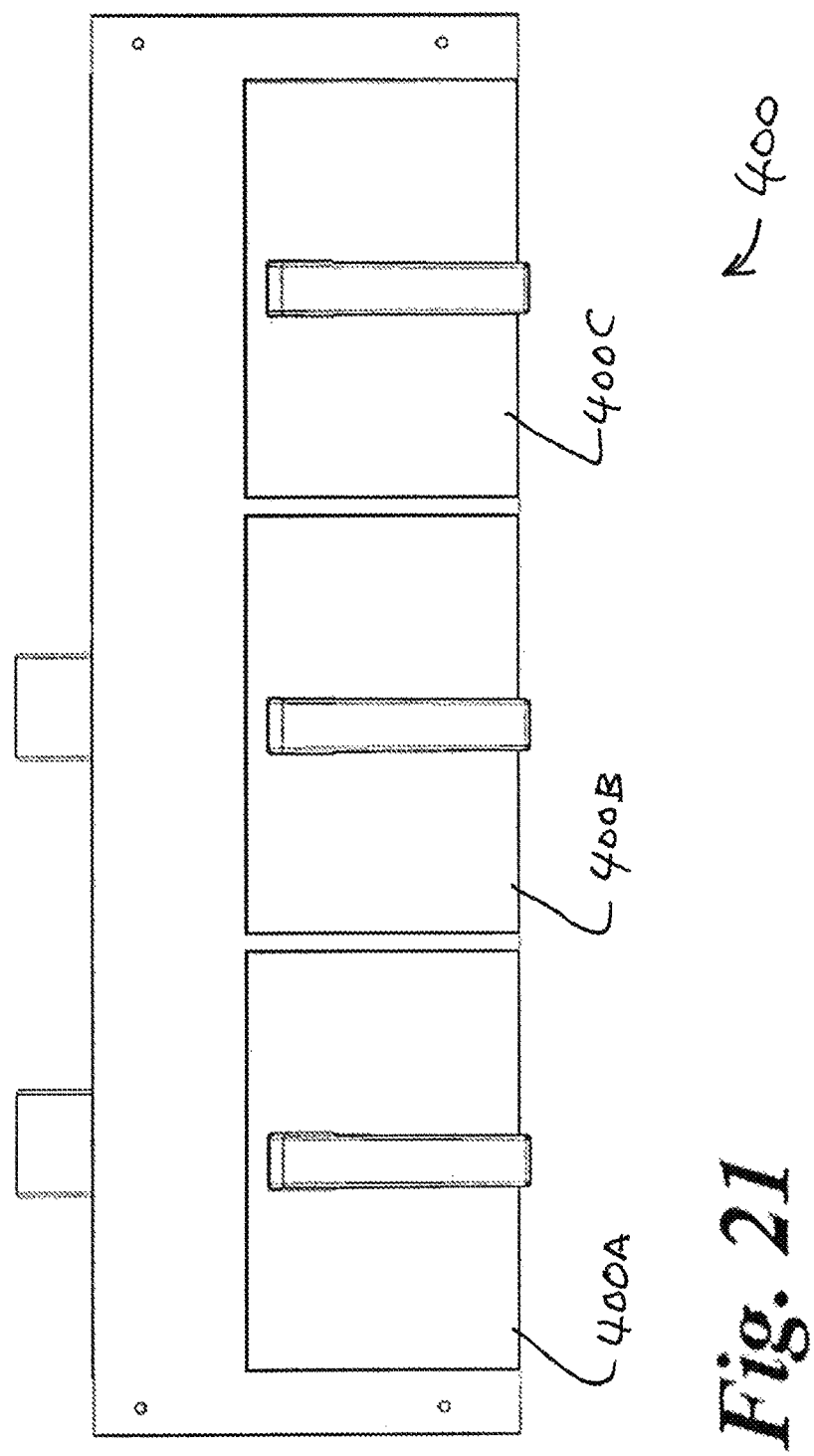
FIG. 21 is a front view of the accessory of FIG. 20.
Figure 22:
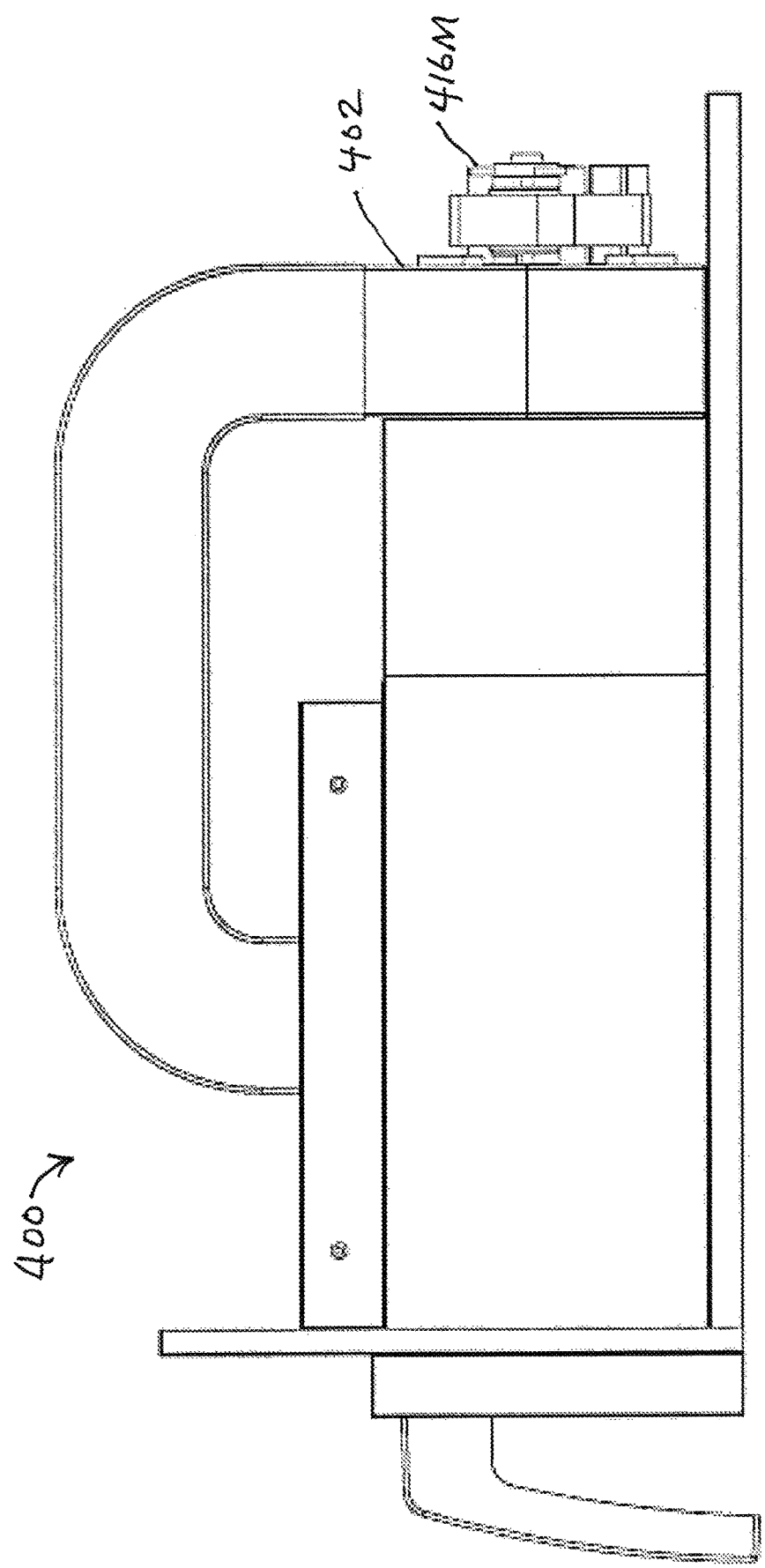
FIG. 22 is a right side view of the accessory of FIG. 20.
Figure 23:
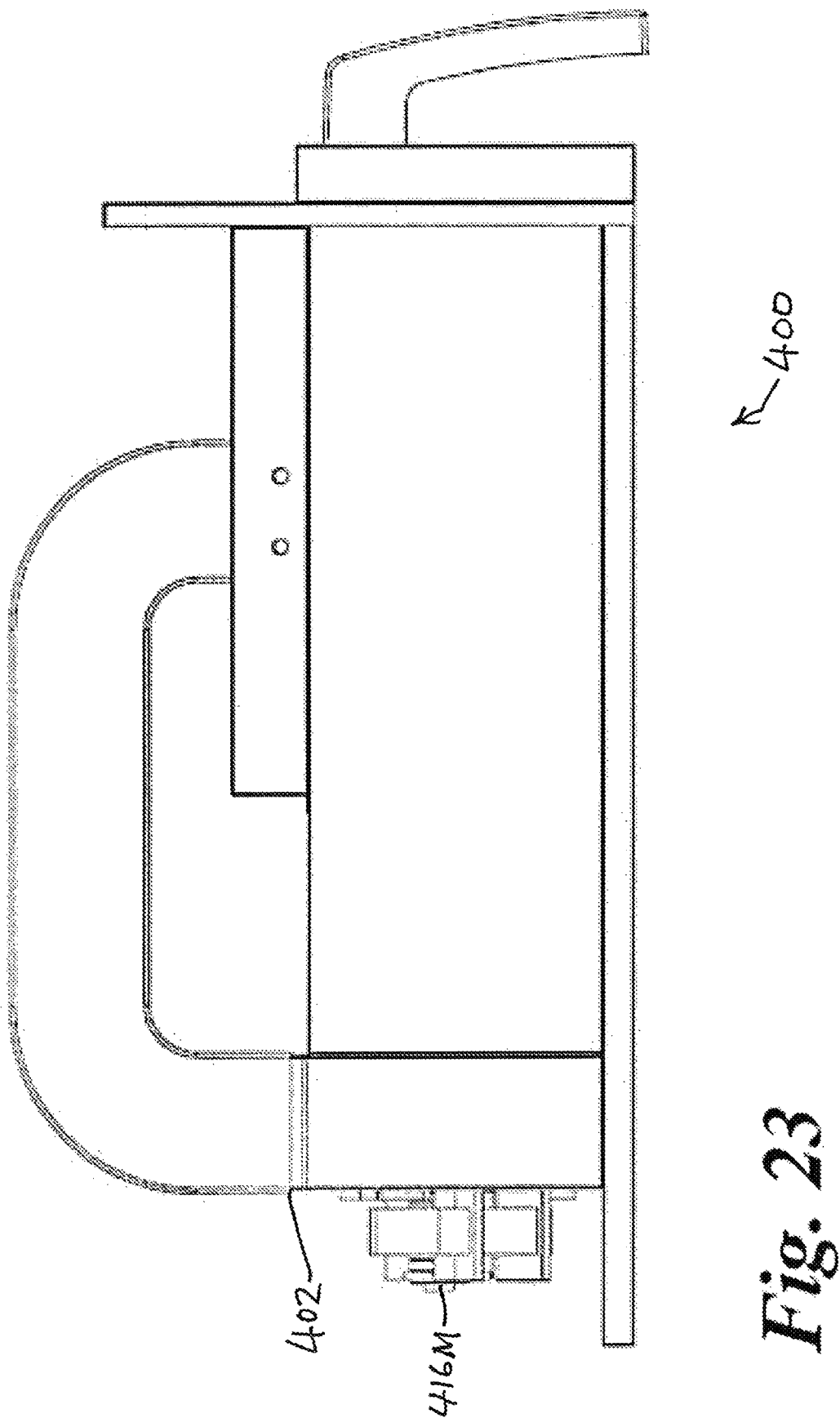
FIG. 23 is a left side view of the accessory of FIG. 20.
Figure 24:
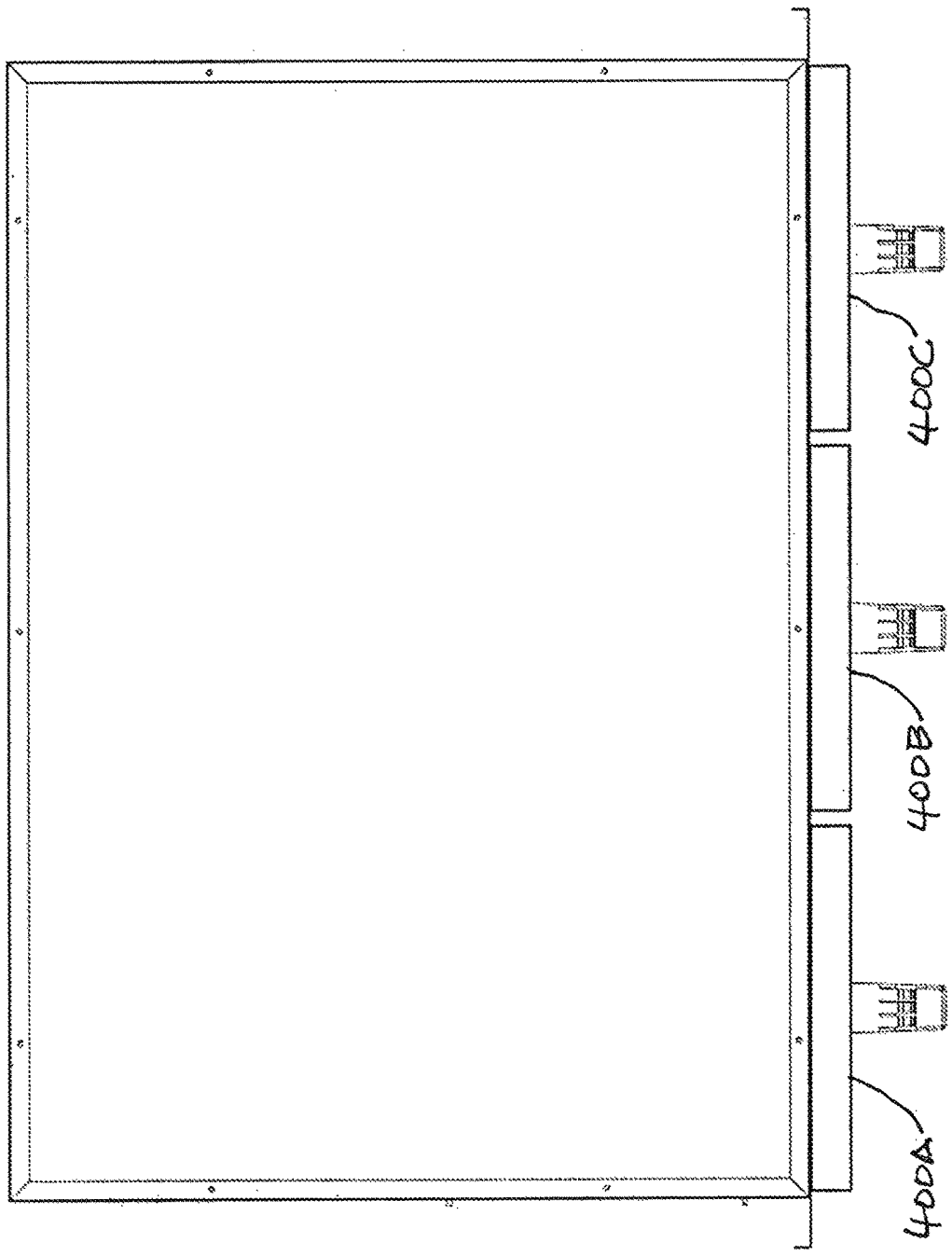
FIG. 24 is a bottom view of the accessory of FIG. 20.
Figure 25:
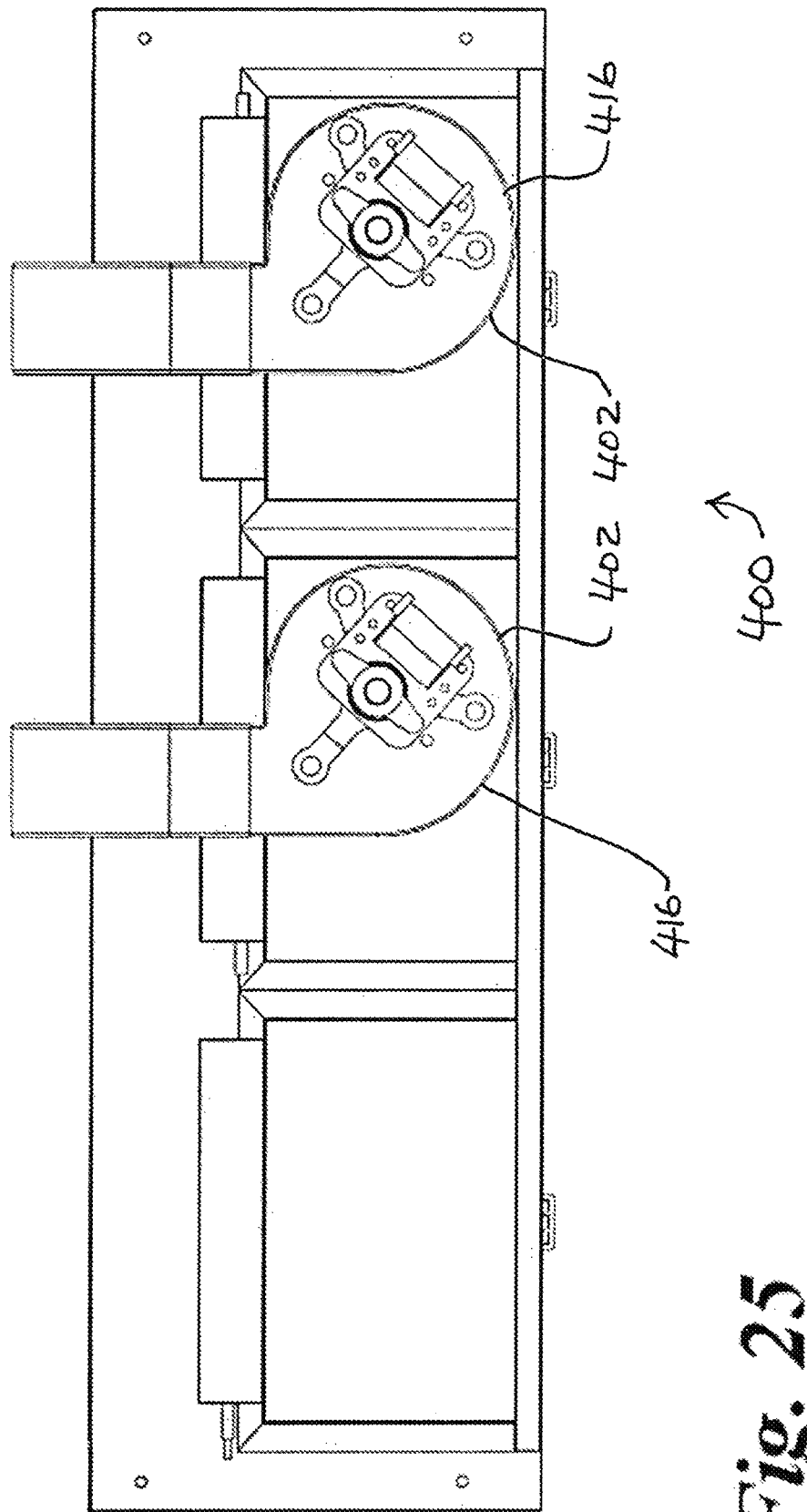
FIG. 25 is a rear view of the accessory of FIG. 20.
Figure 26:
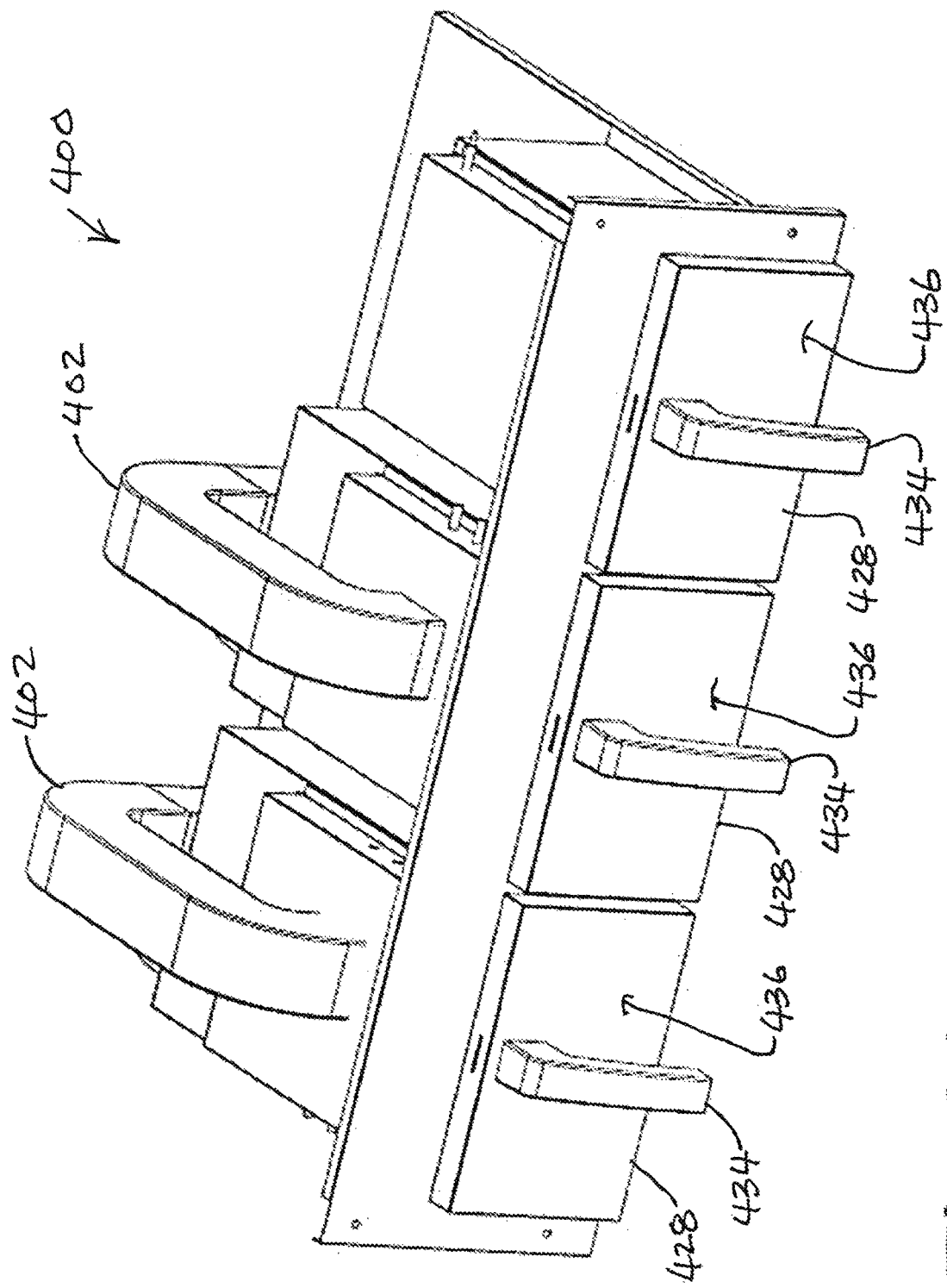
FIG. 26 is a top perspective view of the accessory of FIG. 20.
Figure 27:
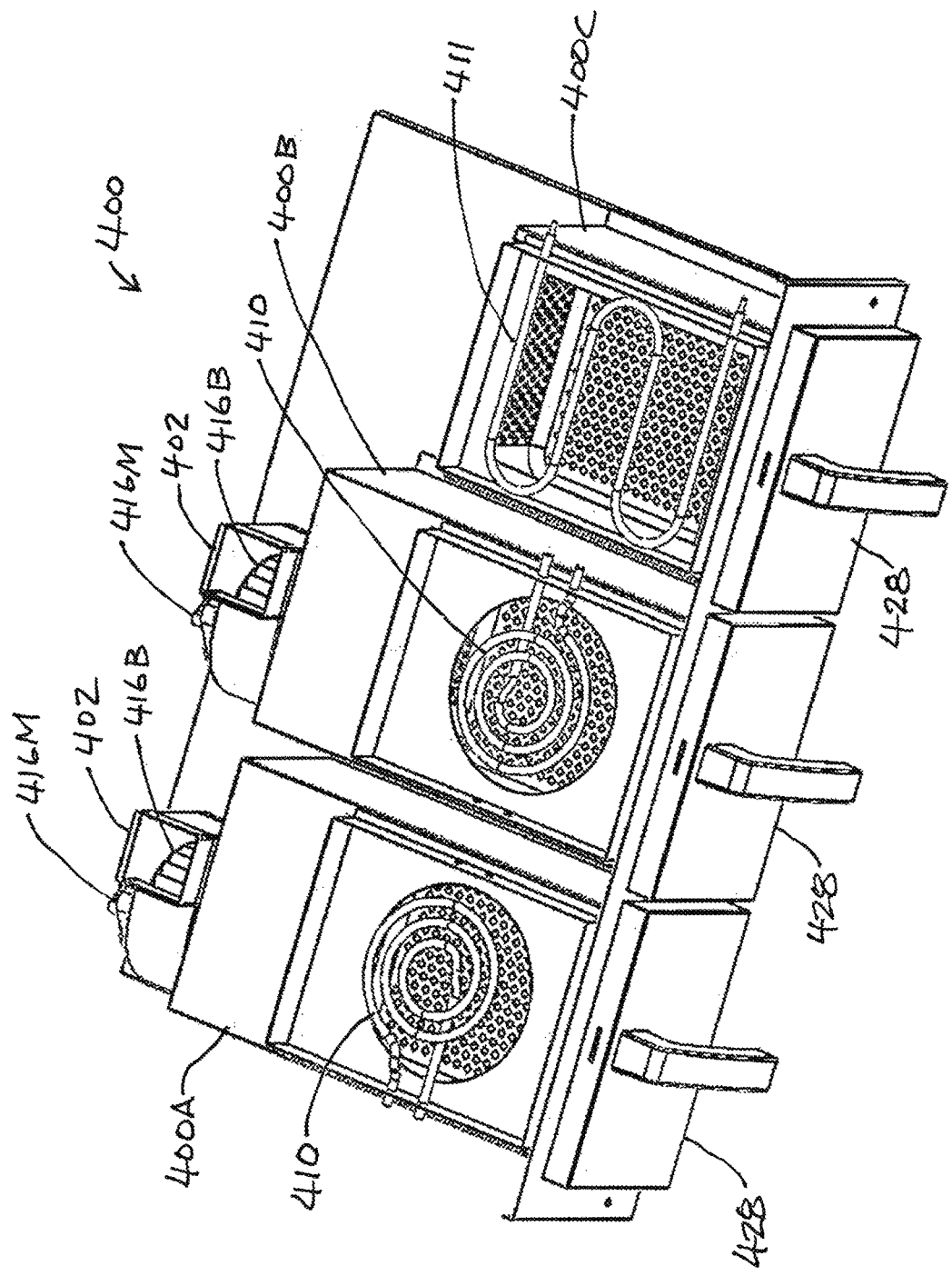
FIG. 27 is a partial top perspective view of the accessory of FIG. 20.

FIG. 19 demonstrates the airflow pattern of the air frying module, where one can see that the air is repeatedly heated each time it cycles past the heating element. This continual reheating and configuration results in a very even distribution of the super-heated air through the perforated bottom panel while allowing it to remain in a very turbulent state, so that the food is exposed to the cooking air evenly on all sides and from all directions. The heated air is forced after air frying the foodstuff by the blower back through the energized heating element in a continuous cycle until the heated air's temperature is approximately 220 C, and then the heating element is de-energized while the blower remains energized until the heated air's temperature drops to approximately 200 C. The use of an electrical heater simplifies the use of a thermostat to monitor and regulate the air temperature.

Referring now to FIGS. 20 through 28, there is shown a third exemplary air frying accessory 400 having plurality of modules 400A, 400B, and 400C, for use within an outdoor cooker such as, but not limited to, barbeque grills like gas barbeque grill 200 of the first embodiment. Module 400A and 400B are identical air frying modules and module 400C is a warming module, but any reasonable combination and number of modules is anticipated.

The air frying modules each have a blower portion 402 and a heater portion 403 and all modules have a chamber portion 404A, 404B, and 404C. Each heater portion has a heating element 410 for heating the air and each blower portion has a blower 416 for dispersing the heated air into the associated module's chamber portion. The warming drawer has a heating element 411 for keeping food warm after having cooked in in one of the air frying modules of in the outdoor cooker.

The blowers are electrical centrifugal blowers, each including an electric motor 416M and a cylindrical blower wheel 416B. The chamber portion includes a perforated basket 420 for receiving foodstuff and to allow access to the foodstuff by the dispersed heated air. The chamber portion is covered by chamber cover 424 so that the basket is enclosed within cooking chamber 426 during frying. The heated air is dispersed to the chamber portion and into and around the foodstuff in the cooking chamber by the blower where it air-fries the foodstuff.

The blower portion, heater portion, and chamber portion are housed by an outdoor cooker in the same way as in the first embodiment. The bottom of the chamber portion is a drawer 428 adapted to be pulled from the cooker to access the basket. When the drawers are so pulled from the cooker, covers 424 remain stationary within the cooker. The open top of the drawer is thereby covered by the cooker during the air-frying and is uncovered when pulled from the cooker as described in the first embodiment, to allow the access to the basket. Each drawer has a handle 434 disposed on its front face 436.

The heater 410 of the air frying modules is a typical spiral tubular resistance heater, but any acceptable form of air heating element is anticipated, but any other acceptable form of air heating element is anticipated, such as a radiant heating element, an infrared heating element, a PTC heating element, etc. The heater 411 of the warming module is a typical serpentine tubular resistance heater, but any acceptable form of air heating element is anticipated, but any other acceptable form of air heating element is anticipated, such as a radiant heating element, an infrared heating element, a PTC heating element, etc.

Figure 28:
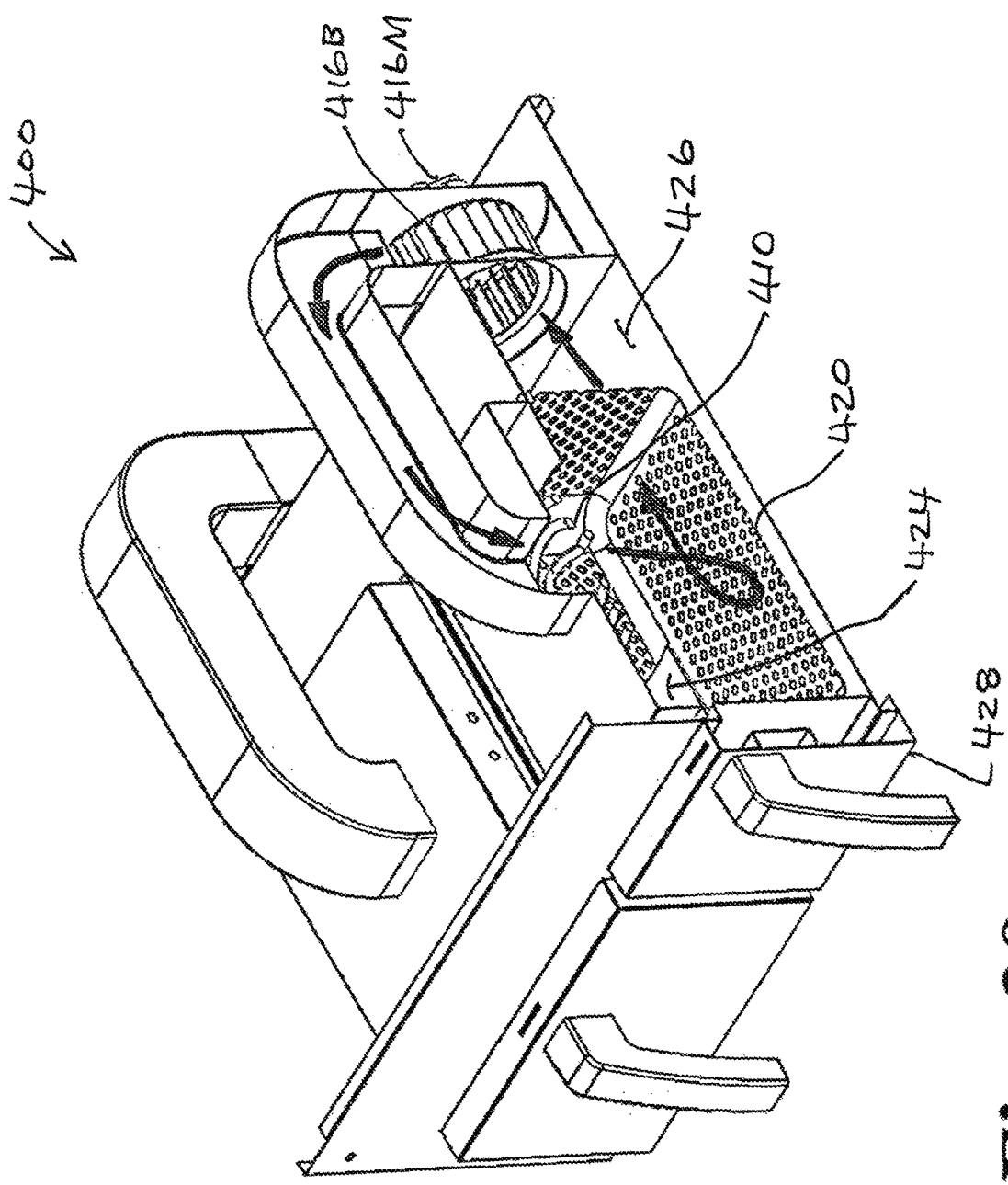
FIG. 28 is a cut-away right perspective view of the accessory of FIG. 20.

FIG. 28 demonstrates the airflow pattern of the air frying module, where one can see that the air is repeatedly heated each time it cycles past the heating element. This continual reheating and configuration results in a very even distribution of the super-heated air through the perforated bottom panel while allowing it to remain in a very turbulent state, so that the food is exposed to the cooking air evenly on all sides and from all directions. The heated air is forced after air frying the foodstuff by the blower back through the energized heating element in a continuous cycle until the heated air's temperature is approximately 220 C, and then the heating element is de-energized while the blower remains energized until the heated air's temperature drops to approximately 200 C. The use of an electrical heater simplifies the use of a thermostat to monitor and regulate the air temperature.

Figure 29:
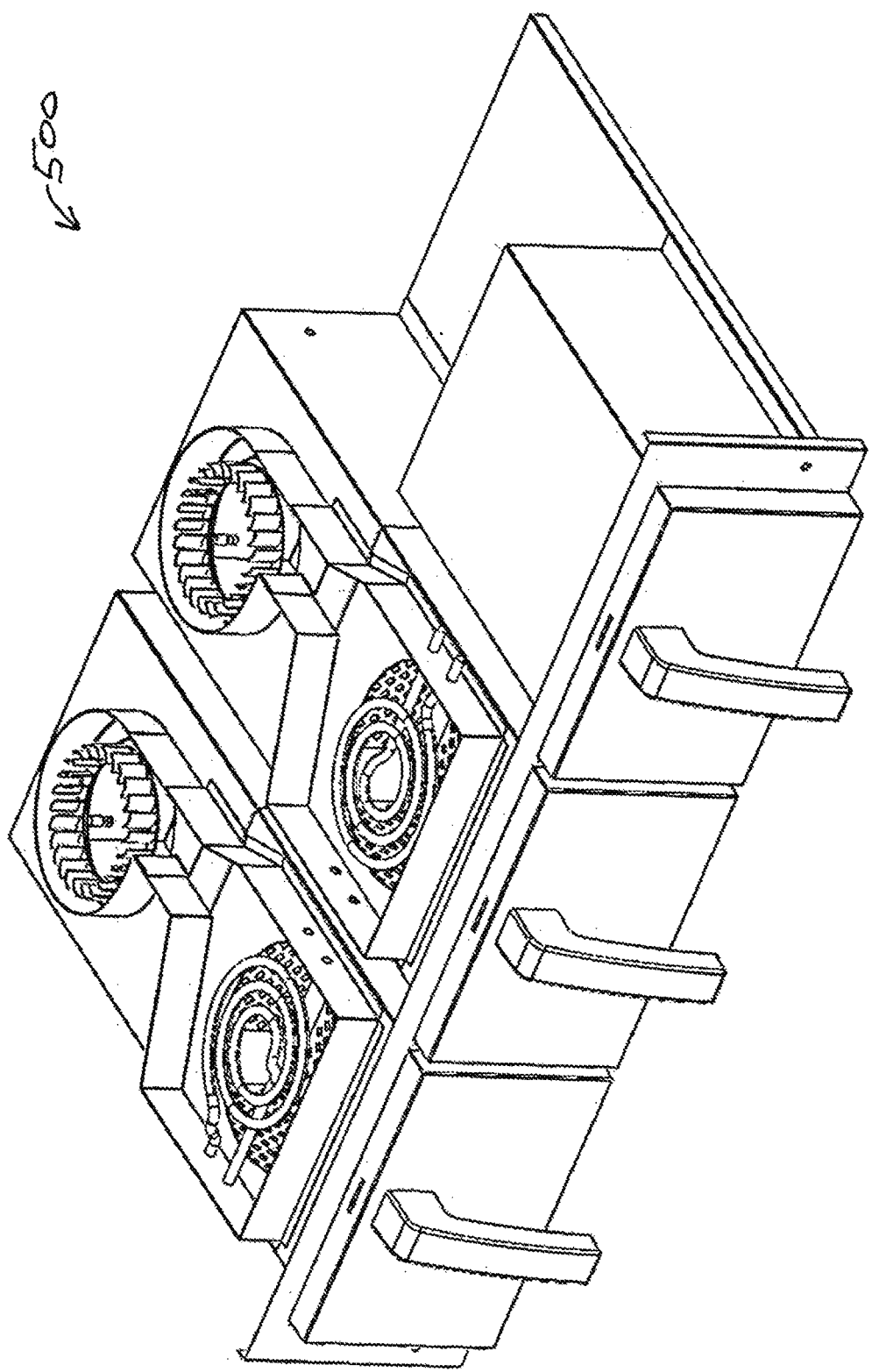
FIG. 29 is a partial right perspective view of a fourth exemplary air frying accessory.
Figure 30:
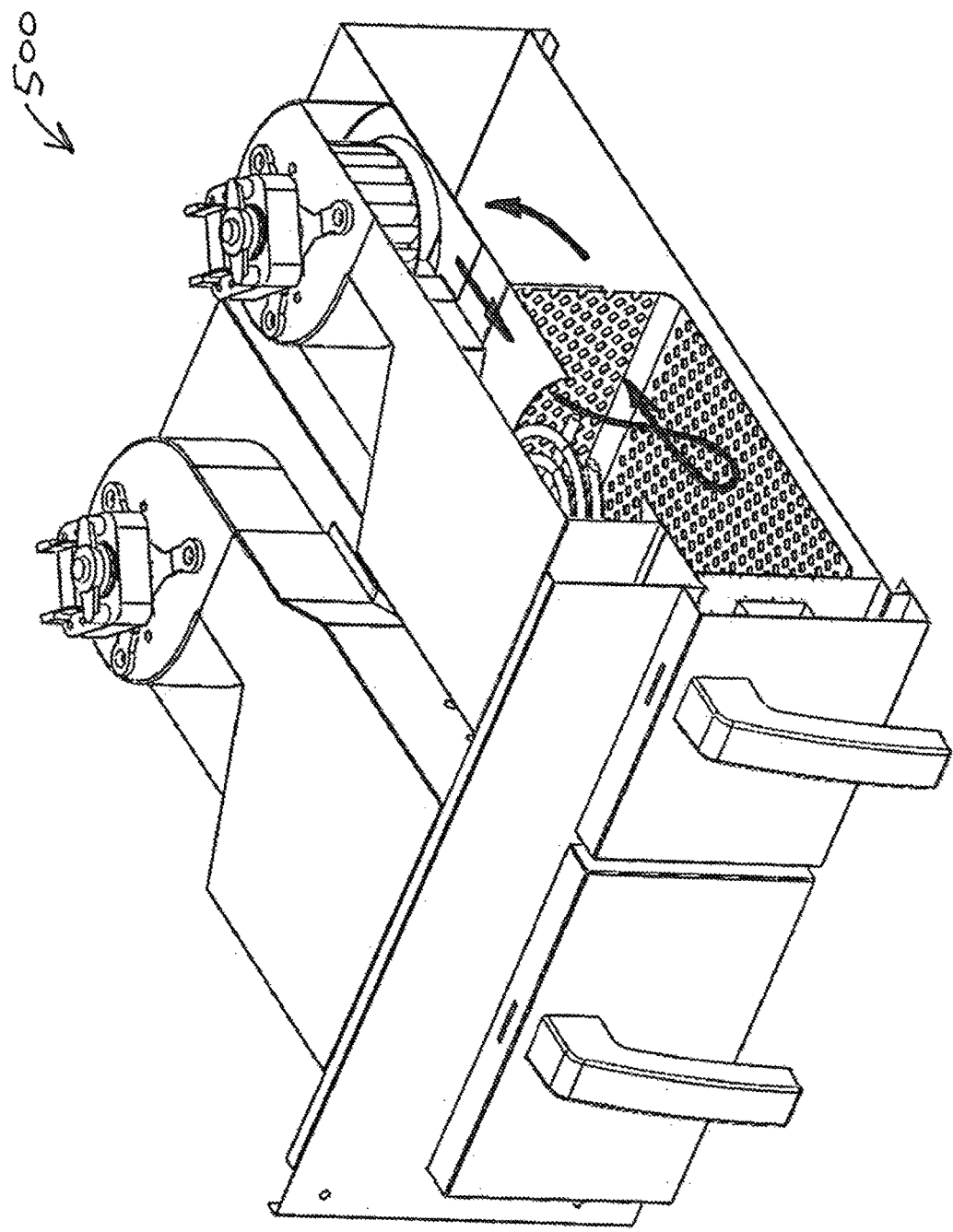
FIG. 30 is a cut-away right perspective view of the accessory of FIG. 29.

FIGS. 29 and 30 show a fourth exemplary air frying accessory 500 which combines certain features of the second and third embodiments in a manner that does not warrant further description.

While the air fryer modules are primarily intended as built-in accessories to an outdoor cooker, one or more modules could alternatively be enclosed within a dedicated housing to provide a stand-alone air frying appliance.

While the invention has been shown and described with reference to specific exemplary embodiments, it should be understood by those skilled in the art that various changes in form and detail may be made without departing from the spirit and scope of the invention, and that the invention should therefore only be limited according to the following claims, including all equivalent interpretation to which they are entitled.

The invention claimed is:

1. An outdoor cooker comprising a fuel-burning outdoor cooking appliance and an air frying apparatus disposed therein: the air frying apparatus having a blower-heater portion and a chamber portion;
wherein
the blower-heater portion comprises a heating element, distinct from the fuel burning of the outdoor cooking appliance, for heating air and a blower for forcing the air to be heated through the heating element and into the chamber portion;
the chamber portion comprises a perforated basket for receiving foodstuff and is adapted to allow access to the foodstuff by the dispersed heated air; and
when the heater and blower are energized, the air heated by the heater is dispersed to the chamber portion by the blower where it air-fries the foodstuff in the basket and is then forced by the blower back through the heating element in a continuous cycle.

2. The apparatus of claim 1 wherein the blower-heater portion and the chamber portion are comprised within the outdoor cooker and the chamber portion comprises a drawer adapted to be pulled from the outdoor cooker to access the basket.

3. The apparatus of claim 2 wherein the drawer is covered by the outdoor cooker during the air-frying and is uncovered when pulled from the outdoor cooker to allow the access to the basket.

4. The apparatus of claim 3 wherein the drawer comprises a handle disposed on a front of the outdoor cooker.

5. The apparatus of claim 4 wherein when the heater and blower are energized, the air is forced after air frying the foodstuff by the energized blower back through the energized heating element in a continuous cycle until the air's temperature is approximately 220 C, and then the heating element is de-energized while the blower remains energized until the air's temperature drops to approximately 200 C.

6. The apparatus of claim 5 wherein the heating element is an electric heating element.

7. The apparatus of claim 6 wherein the electric heating element is a serpentine tubular element.

8. The apparatus of claim 7 wherein the blower is an electric blower.

9. The apparatus of claim 8 wherein the electric blower is an electric centrifugal blower.

10. An outdoor cooker comprising a fuel-burning outdoor cooking appliance and an air frying apparatus disposed therein: the air frying apparatus having a blower portion, a heater portion, distinct from the fuel burning or the outdoor cooking appliance, and a chamber portion;
wherein
the heater portion comprises a heating element for heating air and the blower portion comprises a blower for forcing the air to be heated through the heating element and into the chamber portion;
the chamber portion comprises a perforated basket for receiving foodstuff and is adapted to allow access to the foodstuff by the dispersed heated air; and
when the heater and blower are energized, the air heated by the heater is dispersed to the chamber portion by the blower where it air-fries the foodstuff in the basket and is then forced by the blower back through the heating element in a continuous cycle.

11. The apparatus of claim 10 wherein the blower portion, heater portion, and chamber portion are comprised within the outdoor cooker and the chamber portion comprises a drawer adapted to be pulled from the outdoor cooker to access the basket.

12. The apparatus of claim 11 wherein the drawer is covered by the outdoor cooker during the air-frying and is uncovered when pulled from the outdoor cooker to allow the access to the basket.

13. The apparatus of claim 12 wherein the drawer comprises a handle disposed on a front of the outdoor cooker.

14. The apparatus of claim 13 wherein when the heater and blower are energized, the air is forced after air frying the foodstuff by the energized blower back through the energized heating element in a continuous cycle until the air's temperature is approximately 220 C, and then the heating element is de-energized while the blower remains energized until the air's temperature drops to approximately 200 C.

15. The apparatus of claim 14 wherein the heating element is an electric heating element.

16. The apparatus of claim 15 wherein the electric heating element is a serpentine tubular element.

17. The apparatus of claim 16 wherein the blower is an electric blower.

18. The apparatus of claim 17 wherein the electric blower is an electric centrifugal blower.

* * * * *